US012438318B2

(12) United States Patent
Taylor et al.

(10) Patent No.: US 12,438,318 B2
(45) Date of Patent: Oct. 7, 2025

(54) CONNECTORS FOR ELECTRIC MARINE DEVICES

(71) Applicant: Brunswick Corporation, Mettawa, IL (US)

(72) Inventors: Brad E. Taylor, Stillwater, OK (US); Phillip J. Niemann, Howards Grove, WI (US)

(73) Assignee: Brunswick Corporation, Mettawa, IL (US)

( * ) Notice: Subject to any disclaimer, the term of this patent is extended or adjusted under 35 U.S.C. 154(b) by 398 days.

(21) Appl. No.: 18/054,812

(22) Filed: Nov. 11, 2022

(65) Prior Publication Data

US 2024/0162672 A1 May 16, 2024

(51) Int. Cl.
*H01R 31/06* (2006.01)
*H01R 13/04* (2006.01)
(Continued)

(52) U.S. Cl.
CPC ............ *H01R 31/06* (2013.01); *H01R 13/04* (2013.01); *H01R 13/502* (2013.01);
(Continued)

(58) Field of Classification Search
CPC ...... H01R 31/06; H01R 13/04; H01R 13/502; H01R 13/5202; H01R 13/521; H01R 13/645; H01R 2201/26; H01R 13/5219; H01R 13/5221; H01R 13/74; H01R 13/64; H01R 13/6456
(Continued)

(56) References Cited

U.S. PATENT DOCUMENTS 5,823,811 A * 10/1998 Blanchfield ........ H01R 13/5221 439/589
6,022,237 A * 2/2000 Esh .................... H01R 13/5219 439/348
(Continued)

FOREIGN PATENT DOCUMENTS

AU 2021281393 A1 * 10/2022 ............ H01F 38/14
CN 212516607 U * 2/2021

OTHER PUBLICATIONS

Park et al., "Outboard Motor," U.S. Appl. No. 29/848,875, filed Aug. 5, 2022 (drawings, specification, and claims only).
(Continued)

*Primary Examiner* — Tulsidas C Patel
*Assistant Examiner* — Jeffrey Mountain
(74) *Attorney, Agent, or Firm* — Andrus Intellectual Property Law, LLP

(57) ABSTRACT

A pair of connectors for electric marine devices is disclosed. The first connector comprises a first housing, a plug provided within the first housing, a sleeve surrounding the first housing, and an asymmetrical key. The second connector comprises a second housing, a receptacle located within the second housing, and an asymmetrical keyway. The first housing of the first connector is configured to receive the receptacle of the second connector via an open first end of the first housing. A gap between an outer surface of the first housing and the sleeve is configured to receive the second housing of the second connector. The keyway of the second connector is configured to receive the key of the first connector.

21 Claims, 14 Drawing Sheets

(51) Int. Cl.
*H01R 13/502* (2006.01)
*H01R 13/52* (2006.01)
*H01R 13/645* (2006.01)

(52) U.S. Cl.
CPC ....... *H01R 13/5202* (2013.01); *H01R 13/521* (2013.01); *H01R 13/645* (2013.01); *H01R 2201/26* (2013.01)

(58) Field of Classification Search
USPC .......................................................... 439/271
See application file for complete search history.

(56) References Cited

U.S. PATENT DOCUMENTS

| | | | | |
|---|---|---|---|---|
| 6,507,164 | B1 | 1/2003 | Healey et al. | |
| 6,902,446 | B1 | 6/2005 | Healey | |
| 7,104,856 | B1 | 9/2006 | Krupp et al. | |
| 10,017,136 | B1 | 7/2018 | Waisanen et al. | |
| 10,202,180 | B1 | 2/2019 | Amerling et al. | |
| 10,511,121 | B2 | 12/2019 | Milroy et al. | |
| 10,710,691 | B2 | 7/2020 | Amerling et al. | |
| 11,046,405 | B1 | 6/2021 | Groeschel et al. | |
| 11,201,437 | B2 * | 12/2021 | Luo | H01R 13/5202 |
| 11,377,186 | B1 | 7/2022 | Ahlswede et al. | |
| 2014/0242840 | A1 * | 8/2014 | Dang | H01R 13/6586 439/607.01 |
| 2019/0148876 | A1 * | 5/2019 | Milroy | H01R 13/523 439/522 |
| 2021/0371054 | A1 * | 12/2021 | Montague | B63B 32/10 |
| 2022/0029316 | A1 * | 1/2022 | Wu | H01R 13/518 |
| 2022/0194542 | A1 | 6/2022 | Kirchhoff et al. | |
| 2022/0200070 | A1 | 6/2022 | Gonring | |
| 2022/0328912 | A1 | 10/2022 | Gonring | |

OTHER PUBLICATIONS

Johnson et al., “Battery,” U.S. Appl. No. 29/855,548, filed Oct. 4, 2022 (drawings, specification, and claims only).

Futronics, High voltage connector FTP18 Series, admitted prior art, available at https://en.futronics.com.cn/product/106.html.

Futronics, Multi-core connector-(2+8/2+14) IP67, admitted prior art, available at https://en.futronics.com.cn/product/75.html.

Avertronics, C2 waterproof connector & wire hareness assy, admitted prior art, available at https://avertronics.com/en/product/c2-waterproof-connector-2021-e-1/.

Avertronics, D1 waterproof connector & wire hareness assy(80A), admitted prior art, available at https://avertronics.com/en/product/d1-waterproof-connector-2021-e-1/.

Jnicon, E Vehicles Waterproof Power Connector M23 Push Locking 2 Power 1 Grouding 5 Data, admitted prior art, available at https://www.jniconconnector.com/sale-12168416-e-vehicles-waterproof-power-connector-m23-push-locking-2-power-1-grouding-5-data.html.

A&C Solutions, Female Panel Mount Connector—Manual Locking, admitted prior art, available at https://www.higoconnector.com/products/s835am-c-00-hb-0300/L099K#title.

A&C Solutions, Female Panel Mount Connector—Charging & discharging in 1, self-locking, admitted prior art, available at https://www.higoconnector.com/products/s828bm-c-00-gm-0300/0099K#title.

A&C Solutions, Male Angled Plug Connector—Charging & discharging in 1, self-locking, admitted prior art, available at https://www.higoconnector.com/products/s828bg-a-00-cd-1000/v099K#title.

A&C Solutions, Female Panel Mount Connector—Self-locking, admitted prior art, available at https://www.higoconnector.com/products/s526am-c-00-b9-0300/P099K#title.

A&C Solutions, Male Angled Plug Connector, admitted prior art, available at https://www.higoconnector.com/products/z718ag-a-00-gg-1000/Hv99K#title.

A&C Solutions, Male Cable Connector, Self-Locking, Button Release—Self-locking, button release, admitted prior art, available at https://www.higoconnector.com/products/s824bg-a-00-fr-1000/0v99K#title.

A&C Solutions, Female Panel Mount Connector, Self-Locking—Self-locking, button release, admitted prior art, available at https://www.higoconnector.com/products/s824am-c-03-fq-0300/5v99K#title.

Amphenol Sine Systems, AHDP04-24-09PR-SRA, product data sheet, May 8, 2020, available at https://www.amphenol-sine.com/pdf/datasheet/AHDP04-24-09PR-SRA.pdf.

Amphenol Sine Systems, AHDP06-24-09PR-SRA, product data sheet, May 12, 2020, available at https://www.amphenol-sine.com/pdf/datasheet/AHDP06-24-09PR-SRA.pdf.

Amphenol Sine Systems, AHDP06-24-09SR-SRA, product data sheet, May 12, 2020, available at https://www.amphenol-sine.com/pdf/datasheet/AHDP06-24-09SR-SRA.pdf.

Amphenol Sine Systems, AHDP04-24-09SR-SRA, product data sheet, May 8, 2020, available at https://www.amphenol-sine.com/pdf/datasheet/AHDP04-24-09SR-SRA.pdf.

Amphenol Sine Systems, AHDP02-24-07PN-WTACL22, product data sheet, Sep. 1, 2020, available at https://www.amphenol-sine.com/pdf/datasheet/AHDP02-24-07PN-WTACL22.pdf.

Amphenol Sine Systems, AHDP06-24-07SN-SRACL22, product data sheet, May 8, 2020, available at https://www.amphenol-sine.com/pdf/datasheet/AHDP06-24-07SN-SRACL22.pdf.

Amphenol Sine Systems, AHDP04-24-07PN-WTACL22, product data sheet, Jul. 6, 2019, available at https://www.amphenol-sine.com/pdf/datasheet/AHDP04-24-07PN-WTACL22.pdf.

Amphenol LTW, PWMU-04BFMB-TL7001, admitted prior art, available at https://www.amphenolltw.com/product-info/Power/Power.PWMU/PWMU-04BFMB-TL7001.html.

Amphenol LTW, PWMU-04RMFS-TS7001, admitted prior art, available at https://www.amphenolltw.com/product-info/Power/Power.PWMU/PWMU-04RMFS-TS7001.html.

Epropulsion, EPropulsion Spirit 1.0 Plus 3HP Electric Outboard Motor, admitted prior art, available at https://tbnation.net/products/epropulsion-spirit-1-0-plus-3hp-electric-outboard-motor?variant=39585207648391&currency=USD&utm_medium=cpc&utm_source=google&gclid=CjwKCAjwwL6aBhBIEiwADyCBIDOC4V7czgl1ST5foKhCsF37-KCbgqHSKNiuvW1sn1oeKx5EfOjQQhoC6RkQAvD_BWE.

Epropulsion, Epropulsion Navy Evo 6.0 LongShaft, admitted prior art, available at https://liquidsurfandsail.com/epropulsion-navy-evo-6-0-longshaft/?sku=NE-6000-L0&utm_source=google&utm_medium=cpc&adpos=&scid=scplpNE-6000-L0&sc_intid=NE-6000-L0&gclid=CjwKCAjwwL6aBhBIEiwADycBIP5gTVPPII1YYGbLWTypeM9Maysj113Wu9pUQ2i4HJmecrKz-WzRFhoCQ1EQAvD_BwE.

Fergus et al., U.S. Appl. No. 17/487,116, filed Sep. 28, 2021, “Outboard Motor That Is Removable From Transom Clamp Bracket” (specification, claims, and drawings only).

Schrank et al., U.S. Appl. No. 17/509,739, filed Oct. 25, 2021, “Integrated Copilot And Locking Mechanism For Marine Drives” (specification, claims, and drawings only).

Nickols et al., U.S. Appl. No. 17/884,355, filed Aug. 9, 2022, “Transom Bracket Assemblies For Supporting A Marine Drive On A Vessel” (specification, claims, and drawings only).

Kalnins et al., U.S. Appl. No. 17/695,200, filed Mar. 15, 2022, “Electric Marine Propulsion System And Control Method” (specification, claims, and drawings only).

Park et al., U.S. Appl. No. 29/848,875, filed Aug. 5, 2022, “Outboard Motor” (specification, claim, and drawings only).

Johnson et al., U.S. Appl. No. 29/855,548, filed Oct. 4, 2022, “Battery” (specification, claims, and drawings only).

Fletcher, U.S. Appl. No. 17/939,474, filed Sep. 7, 2022, “Marine Drives And Apparatuses For Steering Marine Drives And For Routing Flexible Rigging Connectors On Marine Drives” (specification, claims, and drawings only).

McEathron et al., U.S. Appl. No. 17/972,691, filed Oct. 25, 2022, “Marine Drives and Apparatuses for Steering Marine Drives and for Routing Flexible Rigging Connectors on Marine Drives” (specification, claims, and drawings only).

(56) References Cited

OTHER PUBLICATIONS

Amphenol Sine Systems, AHDP04-24-08PN-M1WTA, product data sheet, Sep. 22, 2021.
Amphenol Sine Systems, AHDP06-24-08SN-M1WTA, product data sheet, Sep. 22, 2021.
Amphenol Sine Systems, AHDP02-24-08PN-M1SRA, product data sheet, Sep. 22, 2021.

* cited by examiner

CONNECTORS FOR ELECTRIC MARINE DEVICES

FIELD

The present disclosure generally relates to connectors for electric marine devices such as electric marine drives and batteries for powering such electric marine drives.

BACKGROUND

Electric propulsion systems comprising an electric marine drive having an electric motor rotating a propeller are known. For example, in-board electric marine drive systems and outboard electric marine drive systems have been developed for propelling marine vessels. Different power supply arrangements for powering electric propulsion systems are also known. Such power storage systems include one or more batteries or banks of batteries.

The following U.S. Patents and Applications provide background information and are each incorporated herein by reference in their entireties.

U.S. Publication No. 2022/0328912 discloses a marine battery system configured to provide energy to a marine vessel load. The marine battery system includes a main enclosure body and an auxiliary enclosure body that is detachably coupled to the main enclosure body to define a sealed battery volume. The auxiliary enclosure body is configured to perform a pressure accommodation action responsive to an increase in a temperature within the sealed battery volume. The marine battery system further includes a battery disposed within the sealed battery volume.

U.S. Publication No. 2022/0200070 discloses a marine battery system configured to provide energy to a marine vehicle load. The marine battery system includes a battery, an enclosure configured to at least partially encapsulate the battery, a temperature sensor configured to detect temperature information within the enclosure, a pressure sensor configured to detect pressure information within the enclosure, and a controller coupled to the temperature sensor and the pressure sensor. The controller is configured to receive the temperature information from the temperature sensor, receive the pressure information from the pressure sensor, determine whether an enclosure breach condition has occurred based on a comparison of the temperature information and the pressure information, and in response to a determination that the enclosure breach condition has occurred, perform an enclosure breach mitigation action.

U.S. Pat. No. 11,377,186 discloses an apparatus for operably connecting a marine drive to a marine vessel. A transom bracket is configured for fixed attachment to the marine vessel and for attachment to the marine drive such that the marine drive is trimmable up and down relative to the marine vessel about a trim axis. The transom bracket has a sidewall with a rigging opening through which at least one elongated rigging member extends for operably connecting the marine drive to the marine vessel, wherein the rigging opening is located along the trim axis. The rigging device has an elbow conduit with an inlet end and an outlet end, wherein the outlet end is positionable into a plurality of clock positions relative to the inlet end.

U.S. patent application Ser. No. 17/487,116, filed Sep. 28, 2021, discloses an outboard motor having a transom clamp bracket configured to be supported on a transom of a marine vessel and a swivel bracket configured to be supported by the transom clamp bracket. A propulsion unit is supported by the swivel bracket, the propulsion unit comprising a head unit, a midsection below the head unit, and a lower unit below the midsection. The head unit, midsection, and lower unit are generally vertically aligned with one another when the outboard motor is in a neutral tilt/trim position. The propulsion unit is detachable from the transom clamp bracket.

U.S. patent application Ser. No. 17/939,474, filed Sep. 7, 2022, discloses a marine drive including a frame configured to support the marine drive with respect to the marine vessel, a cowling enclosing a portion of the frame in a cowling interior, a steering arm configured such that movement of the steering arm causes rotation of the marine drive with respect to the steering axis, and a flexible rigging connector extending from the cowling interior to a location in the marine vessel. The flexible rigging connector may extend through a guide passage in the steering arm. Additionally or alternatively, the steering arm may include a base member and a mounting member selectively movable relative to the base member to adjust the length of the steering arm.

U.S. patent application Ser. No. 29/848,875, filed on Aug. 5, 2022, discloses an ornamental design for an outboard motor.

U.S. patent application Ser. No. 29/855,548, filed on Oct. 4, 2022, discloses an ornamental design for a battery.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a connector for a marine device comprises a barrel-shaped housing having an open first end and an opposite second end; a plug provided within the housing, the plug comprising a plurality of electrical pins; a sleeve surrounding the housing; and a circumferential seal provided about an outer surface of the housing. The housing is configured to receive a first portion of a mating connector via the first end of the housing. An annular gap between the outer surface of the housing and the sleeve is configured to receive a second portion of the mating connector, and the seal is configured to contact the second portion of the mating connector.

In one example, the plurality of electrical pins includes first and second power pins. The first and second power pins are aligned along a diameter of the plug and a remainder of the electrical pins in the plurality of electrical pins are symmetrically located on either side of the diameter of the plug. Optionally, an asymmetrical key is provided within the housing and divides the first and second power pins, the key being configured to be received within a corresponding keyway provided in the first portion of the mating connector. Optionally, an additional key is provided on the outer surface of the housing, the additional key being configured to be received within a corresponding additional keyway formed in the second portion of the mating connector.

In one example, a plurality of wires is respectively connected to the plurality of electrical pins. A backshell has a first end interfacing with the second end of the housing and surrounds the plurality of wires. A first cable jacket extends from an opposite second end of the backshell and the first cable jacket surrounds the plurality of wires. A second cable jacket surrounds a subset of the plurality of wires and the second cable jacket extends through the first cable jacket.

According to another example of the present disclosure, a connector for an electric marine drive comprises a housing configured to pass through an aperture in an outer cowling of the electric marine drive, the housing having an open first end and an opposite second end; a receptacle located within the housing, the receptacle comprising a plurality of electrical sockets; a plurality of wires respectively connected to the plurality of electrical sockets; and a backshell interfacing with the second end of the housing and surrounding the plurality of wires. The connector is configured to be installed through the aperture in the outer cowling such that the backshell and a portion of the housing are located internally of the outer cowling and a remainder of the housing is located externally of the outer cowling. The housing is configured to receive a portion of a mating connector via the first end of the housing.

In one example, the plurality of electrical sockets includes first and second power sockets. The receptacle is generally cylindrical and the first and second power sockets are aligned along a diameter of the receptacle. A remainder of the electrical sockets in the plurality of electrical sockets are symmetrically located on either side of the diameter of the receptacle. Optionally, an asymmetrical keyway is provided in the receptacle and divides the first and second power sockets, the keyway being configured to receive a corresponding key provided on the portion of the mating connector. Optionally, an additional keyway is formed in an inner surface of the housing, the additional keyway being configured to receive a corresponding additional key provided on the portion of the mating connector.

In one example, the connector is configured to be installed in the electric marine drive such that the first and second power sockets are not vertically aligned with one another when the electric marine drive is in an upright position.

In one example, the housing comprises a geometrical feature extending outwardly from an outer surface of the housing. The geometrical feature on the housing is configured to be received in a corresponding geometrical feature in the aperture in the outer cowling in a manner that prevents rotation of the housing with respect to the aperture.

According to another example of the present disclosure, a pair of connectors for marine devices comprises a first connector and a second connector. The first connector comprises a first housing having an open first end and an opposite second end; a plug provided within the first housing, the plug comprising a plurality of electrical pins, wherein first and second electrical pins of the plurality of electrical pins are aligned along a diameter of the plug and a remainder of the electrical pins in the plurality of electrical pins are symmetrically located on either side of the diameter of the plug; a sleeve surrounding the first housing; and an asymmetrical key provided within the first housing and dividing the first and second electrical pins. The second connector comprises a second housing having an open first end and an opposite second end; a receptacle located within the second housing, the receptacle comprising a plurality of electrical sockets, wherein first and second electrical sockets of the plurality of electrical sockets are aligned along a diameter of the receptacle and a remainder of the electrical sockets in the plurality of electrical sockets are symmetrically located on either side of the diameter of the receptacle; and an asymmetrical keyway provided in the receptacle and dividing the first and second electrical sockets. The first housing of the first connector is configured to receive the receptacle of the second connector via the first end of the first housing. A gap between an outer surface of the first housing and the sleeve is configured to receive the second housing of the second connector. The keyway of the second connector is configured to receive the key of the first connector.

In one example, the second connector further comprises a plurality of wires respectively connected to the plurality of electrical sockets and a backshell interfacing with the second end of the second housing and surrounding the plurality of wires. The second connector is configured to be installed through an aperture in an outer cowling of an electric marine drive such that the backshell and a portion of the second housing are located internally of the outer cowling and a remainder of the second housing is located externally of the outer cowling. Optionally, the second connector is configured to be installed in the electric marine drive such that the first and second electrical sockets are not vertically aligned with one another when the electric marine drive is in an upright position. Optionally, the second housing comprises a geometrical feature extending outwardly from an outer surface of the second housing and the geometrical feature on the second housing is configured to be received in a corresponding geometrical feature in the aperture in the outer cowling in a manner that prevents rotation of the second housing with respect to the aperture.

In one example, an additional key is provided on the outer surface of the first housing and an additional keyway is formed in an inner surface of the second housing. The additional keyway is configured to receive the additional key.

In one example, a plurality of wires is respectively connected to the plurality of electrical pins. A backshell has a first end interfacing with the second end of the first housing and surrounds the plurality of wires. A first cable jacket extends from an opposite second end of the backshell and the first cable jacket surrounds the plurality of wires. A second cable jacket surrounds a subset of the plurality of wires and the second cable jacket extends through the first cable jacket.

In one example, a first perimetral seal is located within the second housing around an outer surface of the receptacle and the first perimetral seal is configured to abut the first end of the first housing. A second perimetral seal is provided about an outer surface of the first housing and the second perimetral seal is configured to contact an inner surface of the second housing. The second perimetral seal is located between the first and second ends of the first housing.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
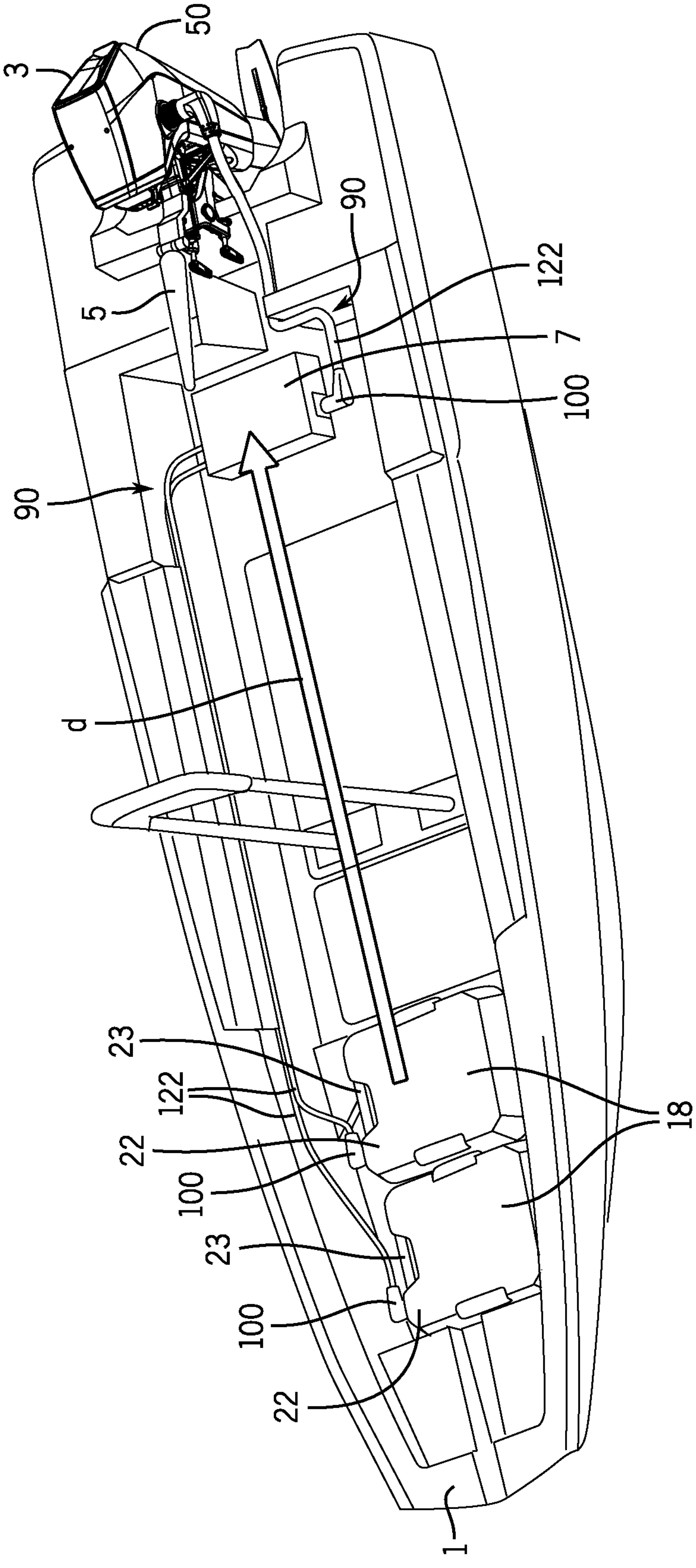
FIG. 1 illustrates a marine vessel having an electric marine propulsion system according to the present disclosure, in which an electric marine drive is controlled by a tiller.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings and can include electrical couplings. "Electrical" couplings or connections can include, but are not limited to, power and signal connections.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Any of the elements shown or described as being male or female elements may instead be of the opposite gender, it being understood that the second element with which the first element mates would necessarily also have the opposite gender from that shown or described.

Through extensive experimentation and research in the relevant field, the present inventors have recognized problems with existing electric marine propulsion system arrangements. Installation of existing electric propulsion systems on a marine vessel is difficult, requiring electrical expertise, particularly for systems with energy capacity needs that require external power storage devices, such as batteries or battery banks. Additionally, the inventors have recognized that marine environments present particular challenges for electric propulsion systems, where the constant exposure to water (particularly salt water) causes corrosion, increased chances for electrical shorts, etc. Installing water-tight and/or marine-safe electrical rigging is difficult, and current systems require dedicated rigging space for electrical connections on the marine vessel. All of this makes installation, configuration, and maintenance difficult and technical, requiring an expert technician to access the vessel.

The inventors recognized a need for a propulsion system that is modular and portable, including being configured for flexible movement and arrangement of parts around a marine vessel and for accommodating variable power storage capacity that is easily and instantaneously scaled up or down by connecting or disconnecting batteries into/from the system. Further, the inventors have recognized a need for an electric propulsion system that can be installed by a novice user on any small vessel, and thus which does not require complicated electrical rigging or installation and does not require dedicated or predefined spaces for rigging electrical connections. Similarly, the inventors have recognized a need for such a plug-and-play electric propulsion system that has built-in features for withstanding harsh marine environments, including water-safe electrical connections and power control that does not rely on user configuration or installation.

In view of the forgoing problems and challenges in the relevant art, the inventors developed the disclosed electric propulsion system that is easily installed on a vessel, requiring only minimal connection and disconnection of cables that provide unitary connection points for all power, data, and safety systems. As disclosed, the electric marine propulsion system is scalable, allowing easy addition and subtraction of batteries into/from the system at any time, including during operation of the electric marine drive, without interrupting power supply to the electric marine drive. Additionally, the system is scalable to add additional electric marine drives, which can be communicatively linked to provide scalable and unified propulsion output. In some disclosed embodiments, the electric marine propulsion system is portable, where each of the batteries, switch box, and/or electric marine drive may be configured to be carried on and off the marine vessel with ease, such as with every use.

In one embodiment, the electric marine propulsion system includes an electric marine drive having an electric motor powerhead powered by at least two marine batteries, such as a plurality of batteries each having a maximum operating voltage at or below 60 volts. A switch box is removably connected between the electric marine drive and to each of the at least two batteries so as to electrically connect each of the at least two marine batteries in parallel to the electric marine drive for powering the electric marine drive. The switch box may be configured to permit connection of one or a plurality of batteries up to a maximum number and may be configured to allow connection and disconnection of batteries while maintaining power delivery to the electric marine drive. For example, the switch box may be configured to allow connection of up to four marine batteries in parallel, wherein any subset of the four marine batteries can be disconnected from the switch box without disabling power delivery to the electric marine drive from the remaining batteries.

The switch box may include a user-controlled switch operable to centrally connect and disconnect all of batteries that are arranged in parallel. The switch box may also include a charging port and may be configured to deliver a charge current from a charger to all of the connected batteries.

Figure 2:
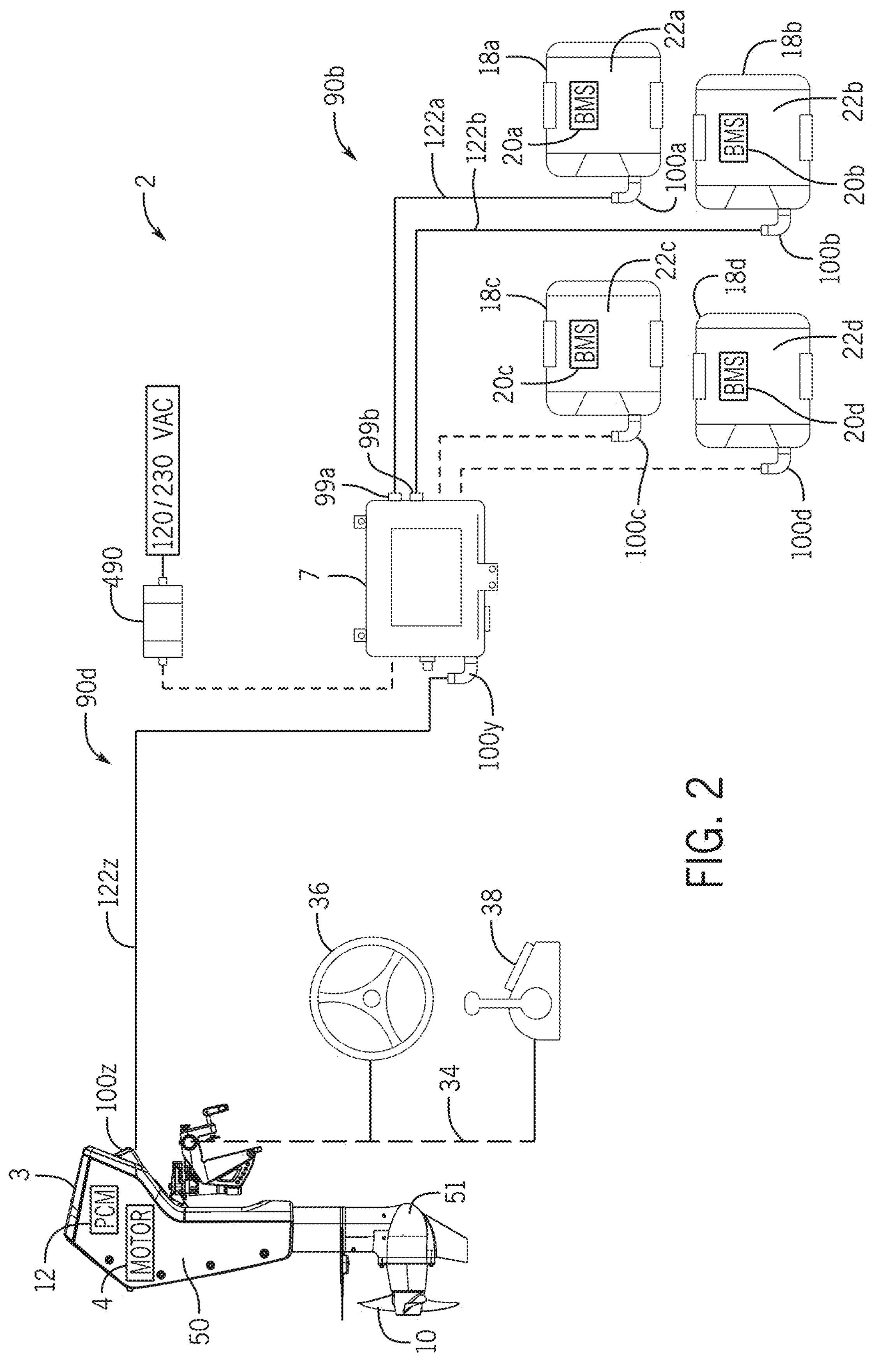
FIG. 2 is a schematic representation of another electric marine propulsion system according to the present disclosure, in which an electric marine drive is controlled at a helm.
Figure 3:
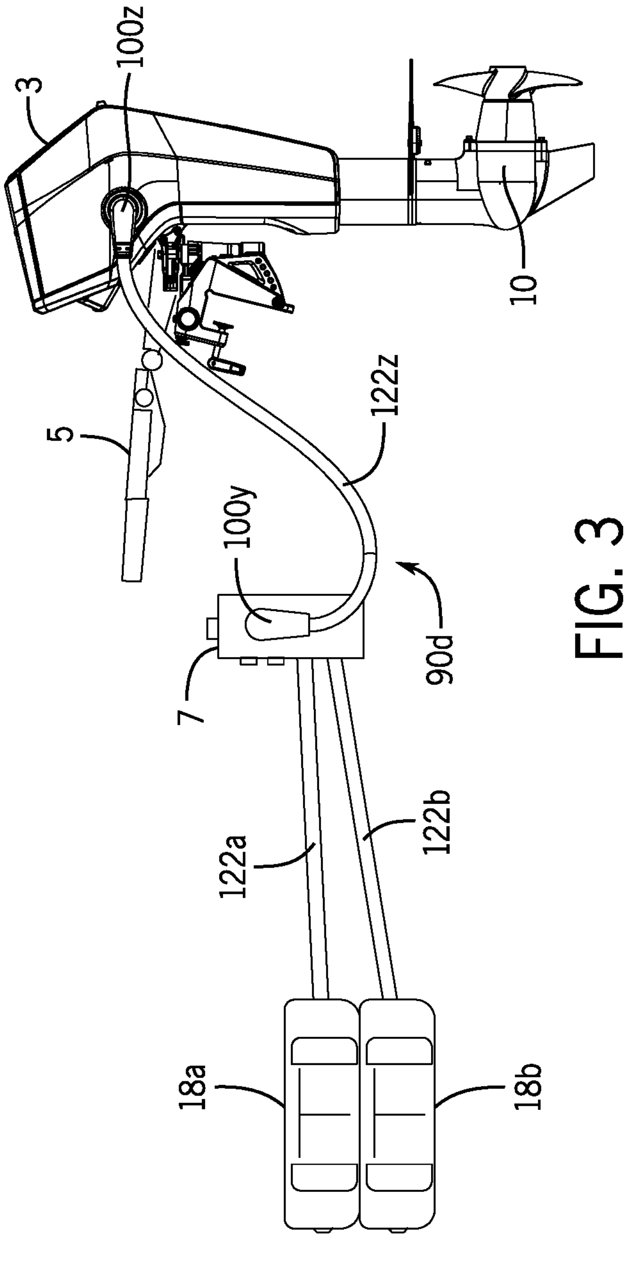
FIG. 3 illustrates an electric marine propulsion system like that of FIG. 1, in which an electric marine drive is connected to a pair of batteries by way of a switch box.
Figure 4:
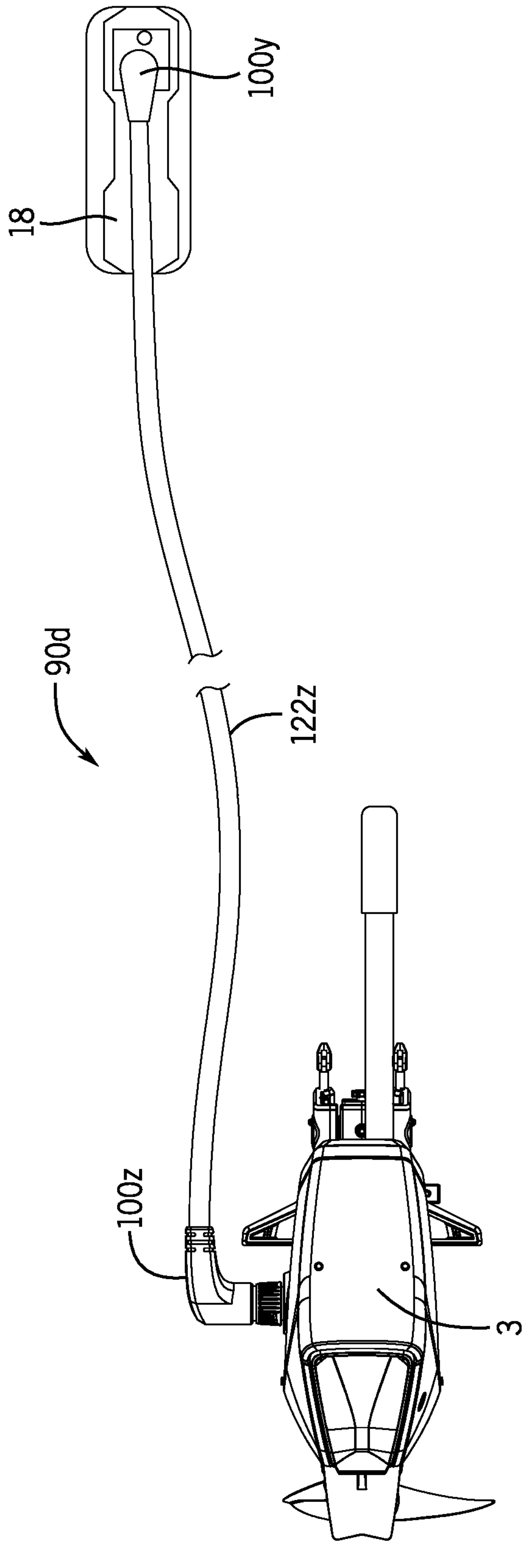
FIG. 4 illustrates yet another electric marine propulsion system according to the present disclosure, in which an electric marine drive is connected to a battery with no intervening switch box.

FIGS. 1 through 4 exemplify electric marine propulsion systems 2 in accordance with the present disclosure. Each electric marine propulsion system 2 includes an electric marine drive 3 powered by one marine battery 18 or a plurality of marine batteries 18 connected in parallel through a switch box 7. The switch box 7 enables multi-battery power distribution, as well as other safety, power control, and charging features. Any number of batteries 18 can be connected to the switch box 7 between one and the maximum number of ports on the switch box 7, which in various embodiments may be four, six, or more ports. The switch box 7 enables connection and disconnection of a plurality of marine batteries (e.g., 18*a-d*), including the addition or disconnection of a subset of marine batteries 18*a-d* without disrupting operation of the marine drive 3. The system 2 is also configured to enable direct connection of the electric marine drive 3 and a single battery 18, as shown in FIG. 4, eliminating the switch box 7 where only one battery 18 is used.

FIG. 1 depicts an exemplary embodiment of the disclosed electric marine propulsion system 2 on a marine vessel 1, which electric marine propulsion system 2 is modular and configured for quick and easy installation on a small marine vessel 1. Each marine battery 18 and the switch box 7 may be portable and configured to be easily transported on and off the marine vessel 1. Each marine battery 18 is separately housed in a marine-safe housing adapted for operation in a marine environment, including for preventing water ingress. For example, each battery housing 22 may have a handle 23 that enables easy carrying on and off the marine vessel 1. The switch box 7 is also contained in a marine-safe housing that is sealed against water ingress and likewise may have a handle (not shown) configured for easy carrying on and off the marine vessel 1.

The switch box 7 removably connects to each of the batteries 18 in parallel via connection cables 90 that each include a cable 122 with a connector 99, 100 (see FIG. 2) on each end. A connection cable 90 also connects the electric marine drive 3 to the switch box 7. Each connector 99, 100 connects to a port on the switch box 7, the battery 18, or the electric marine drive 3 to provide an all-in-one power, data, and interlock connection between the switch box 7 and each of the batteries 18 and between the switch box 7 and the electric marine drive 3. The connectors 99, 100 are twist-to-lock connectors that are easily connected and disconnected from the batteries 18, switch box 7, and electric marine drive 3 so that the system 2 is easily assembled and disassembled. Connection between the electric marine drive 3, the switch box 7, and the batteries 18 via the connection cables 90 is all that is required to install the electrical and data aspects of the electric marine propulsion system 2 on a vessel. Thus, in addition to mounting the electric marine drive 3, installing the electric marine propulsion system 2 only requires plugging in a few connectors 99, 100. The electric marine drive 3 may be connected to the marine vessel 1 via a detachable mount, such as those shown and described in U.S. patent application Ser. Nos. 17/487,116; 17/509,739; or 17/884,335, incorporated by reference herein.

In some embodiments, the connection cable 90 comprises identical elbow connectors 100 on each end of the cable 122 and identical ports are provided on each of the battery 18, switch box 7, and/or on the electric marine drive 3, such that the connection cables 90 between the various devices are reversible (direction agnostic) and interchangeable. This maximizes flexibility and modularity of the system 2, in that the same connection cable 90 can be used two connect any two devices—i.e., between the battery 18 and the switch box 7, between the switch box 7 and the electric marine drive 3, or between the battery 18 and the electric marine drive 3.

The connection cables 90 may be available in various sizes so that a user can customize the system 2 based on their needs and the size constraints of a particular marine vessel. This enables placement of the switch box 7 and each of the one or more batteries 18 at whatever location is convenient. In the example illustrated in FIG. 1, the batteries 18 are placed toward the bow of the marine vessel 1 and the switch box 7 is located toward the stern near the electric marine drive 3. The batteries 18 are mounted at distance d from the switch box 7, which may be 6 to 7 feet or further. Here, a first battery is closer to the switch box 7 that the second battery. Each of the connection cables 90 may be appropriately sized to enable such connection without excess cable length that takes up space, gets caught or tangled. The connection cable 90 between the switch box 7 and the electric marine drive 3 is also appropriately sized, being shorter since it spans a shorter distance. In other vessels, a different location arrangement of the switch box 7 and/or the batteries 18 may be preferable, such as locating the elements in the middle or towards the sides of the marine vessel, and the system 2 is configured to enable any such arrangement.

The systems 2 illustrated in FIGS. 1-4 include an outboard electric marine drive 3 having an electric motor 4 housed therein, such as housed within the cowling 50 of the outboard electric marine drive 3 or in the torpedo housing 51 or other location near the propeller 10. Although the propulsion systems 2 illustrated in the figures comprise an electric marine drive 3 being an outboard, a person of ordinary skill in the art will understand in view of the present disclosure that embodiments of the electric marine propulsion system 2 may include other types of electric marine drives 3, such as inboard drives or stern drives. The electric motor 4 is operably connected to and configured to rotate the propeller 10. As will be known to the ordinary skilled person in the relevant art, the propeller 10 may include one or more propellers, impellers, or other propulsor devices and the term "propeller" may be used to refer to all such devices. In certain embodiments, the electric motor 4 includes a rotor and a stator in a known configuration. The electric motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion.

The electric marine drive 3 is powered by the scalable power storage system 16 that includes one battery 18 or a plurality of batteries 18 connected in parallel. For example, each battery 18 may be a nominal 36 volt or 48 volt battery, or any battery with a maximum operating voltage at or below 60 volts DC. For example, each battery 18 has a maximum operating voltage when fully charged that does not exceed 60 volts, such as 58 volts. The inventors recognized that providing a system configured for operation in the 50 to 60 volt range has advantages of enabling sufficient output, such as powering motors in the 3-5 horsepower range, while also providing a system at voltage levels that are safe and easy for novice users to manage. Each battery 18 is rechargeable, such as by connection to a battery charger 490 when the electric motor 4 is not in use. Various battery devices and systems are known in the relevant art. For example, the power storage system 16 may include one or a plurality of lithium-ion (LI) batteries 18, each LI battery 18 comprised of multiple battery cells. In other embodiments, each battery 18 may be a lead-acid battery, fuel cell, flow battery, ultracapacitor, and/or other devices capable of storing and outputting electric energy.

Referring particularly to FIG. 2, the switch box 7 is configured to accommodate up to four batteries 18*a*-18*d*. Batteries may be connected or disconnected from the switch box 7 without interrupting the power connection of the remaining batteries to the electric marine drive 3. This allows a user to add and remove batteries to the system 2 depending on the distance of travel, and to remove low-charge batteries and add fully charged batteries into the system 2 as needed. In FIG. 2, two batteries 18*a* and 18*b* are shown connected, and two batteries 18*c* and 18*d* are not currently connected but are available to be added to power the electric marine drive 3 as needed.

Each battery 18*a*-18*d* is connected to the switch box 7 via a respective connection cable 90*b*. Each connection cable comprises a cable 122*a*-122*b* (only two are shown) having a connector 99, 100 on each end, where one end connects to one battery 18*a*-18*d* and the other end connects to a port on the switch box 7. Each connection cable 90 may comprise identical connectors on each end, or the connectors on either end may be different from one another. In the example shown, the connection cables 90*b* connecting each of the batteries 18*a*-18*d* to the switch box 7 comprise a battery-end connector being an elbow connector 100*a*-100*d* and a switch box-end connector being a straight connector 99*a*-99*b* (only two are shown). The connectors 99, 100 are described in more detail below.

Referring also to FIG. 3, the connection cable 90*d* connecting the electric marine drive 3 to the switch box 7 has elbow connectors 100*y* and 100*z* on each end. In one embodiment, the connectors 100*y* and 100*z* on cable 122*z* are identical, and thus the connection cable 90*d* can be connected in either orientation. The elbow connectors 100*y* and 100*z* may also be identical with elbow connectors 100*a*-100*d*, and likewise the ports on each of the electric marine drive 3 and batteries 18 may be identical. Thus, the drive connection cable 90*d* (and likewise the battery connection cables 90*b* if they also have two identical elbow connectors 100) can also be utilized to connect the electric marine drive 3 directly to the battery 18.

This arrangement is shown in FIG. 4, where the same drive connection cable 90*d* is connected to a battery 18. Specifically, elbow connector 100*y* is moved from the switch box 7 and is connected to the battery 18 instead. This enables a simplified system if only one battery 18 is being used. It also enables easy and direct connection to a battery 18 in a situation where the switch box 7 has a failure.

Each battery 18*a*-18*d* may include an associated battery controller 20*a*-20*d*. Each battery controller 20*a*-20*d* (e.g., BMS) is configured to monitor and/or control the respective battery, including being configured to monitor parameters measured within the battery housing 22*a*-22*d*—such as current, voltage, temperature, pressure, etc.—and determine battery charge level (e.g., battery state of charge and/or battery voltage), battery temperature, battery state of health, etc. The battery controller 20*a*-20*d* may be further configured to determine a power limit for the battery 18*a*-18*d*, which is an amount of power that the battery 18*a*-18*d* can supply without overheating, over discharging, or otherwise compromising the battery.

The battery controllers 20*a*-20*d* may be configured to communicate those values via a communication link 34 to other control devices in the system 2, including a central controller 12, which in the embodiment shown in FIG. 2 is a propulsion control module (PCM) located in the electric marine drive 3. Other devices, such as steering wheel 36 and throttle lever 38 may also communicate with the central controller 12 via the communication link 34, which may be the same communication means or different. To provide one example, the communication link(s) 34 may be one or more CAN buses, such as operating via a Kingdom Network protocol. As explained in more detail below, the communication link 34 between the batteries 18*a*-18*d* and the electric marine drive 3 runs through the connection cables 90 and the switch box 7.

Each battery controller 20*a*-20*d* may also be configured to control whether the respective battery 18*a*-18*d* is connected to deliver power, and thus is in a power delivery mode, or is inactive and in a disconnected mode in which the battery is disconnected from and not delivering power to the electric marine drive 3. Each battery 18*a*-18*d* includes an internal disconnect switch that internally disconnects the battery cells or other storage elements from the output terminals. Where a battery 18*a*-18*d* is in an inactive state, the respective battery controller 20*a*-20*d* may be configured to communicate a power limit of zero and/or to communicate an error or disconnected status indicating that the battery 18*a*-18*d* is not active or available to provide power.

The electric marine propulsion system 2 is configured to propel the marine vessel 1 in a direction instructed by an operator. In the depicted embodiment, the electric marine drive 3 is an outboard drive steered and controlled by a tiller handle 5, such as one of various tiller arrangements that are well known in the relevant art. FIG. 2 shows an embodiment including an outboard electric marine drive 3 connected to steering and throttle control devices at the helm, including a steering wheel 36 and a throttle lever 38. Alternatively or additionally, the helm devices may include a joystick, push buttons, a touch screen, or other user input device enabling throttle and/or steering control. Alternatively or additionally, the helm devices may include a computing system and/or a hand-held mobile device, such as a cell phone, communicatively connected to the electric marine drive 3, for example, as part of an onboard management system, such as the VesselView™ and/or VesselView Mobile™ system by Mercury Marine of Fond du Lac, Wisconsin.

A control system of the electric marine propulsion system 2 may include a plurality of control devices configured to cooperate to provide the method of controlling the electric marine propulsion system 2 and the marine batteries 18*a-d*, including power mode selection. For example, the control system includes a central controller 12, a plurality of battery controllers 20*a*-20*d*, and one or more motor controllers, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric marine propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system and peripheral devices.

FIGS. 5-19 show details of the connection cables 90, including the connectors 100 and cables 122. FIGS. 5-19 also show details of connectors 200, 300 that may serve as the ports on the electric marine drive 3, switch box 7, and batteries 18, and how the connectors 100 can be mated with the connectors 200, 300 to connect the various devices in the electric marine propulsion system 2.

Figure 5:
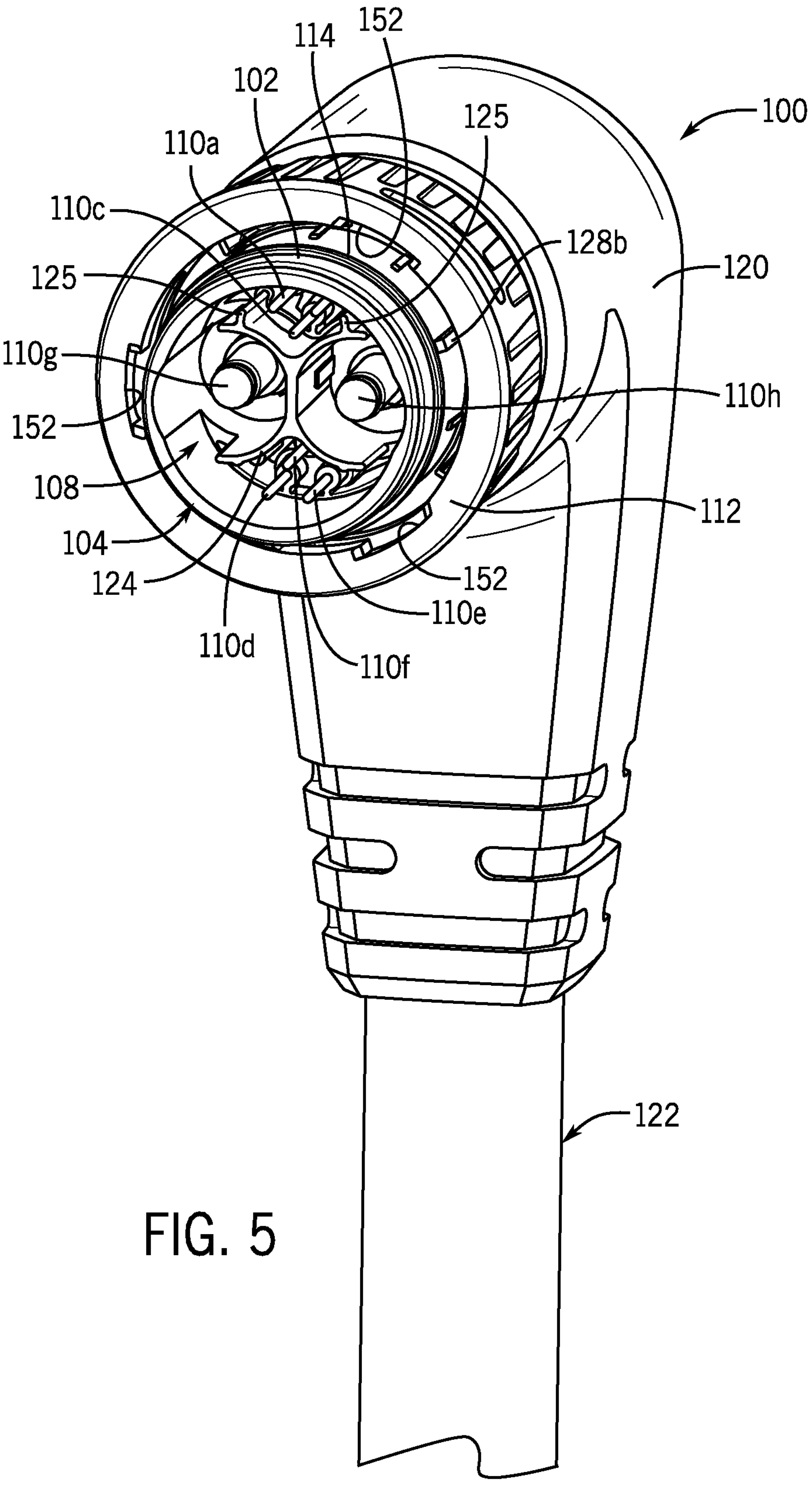
FIG. 5 is a perspective view of a first connector for a marine device of the electric marine propulsion systems of the present disclosure.
Figure 6:
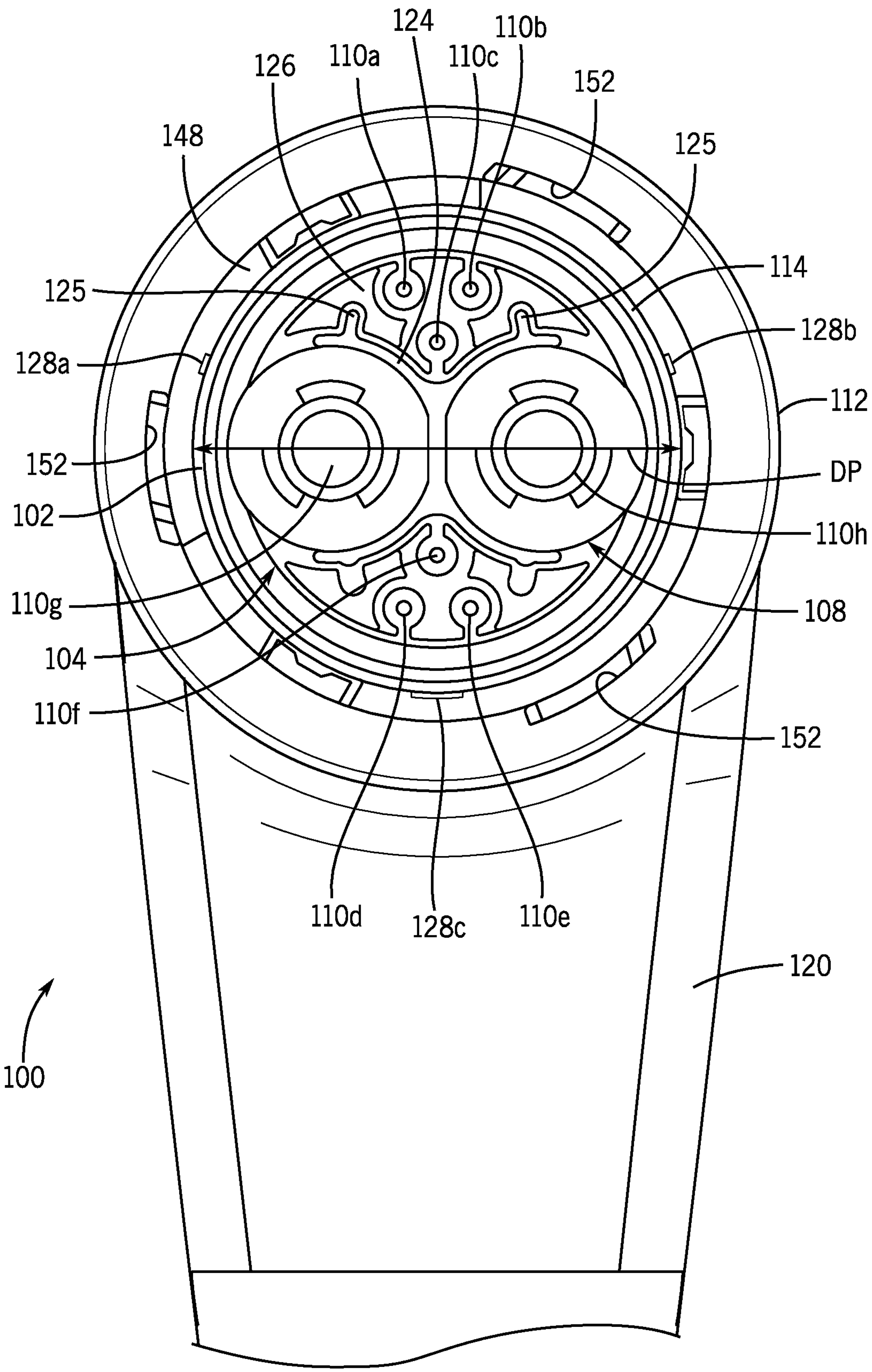
FIG. 6 is a view looking into a housing of the first connector of FIG. 5.
Figure 9:
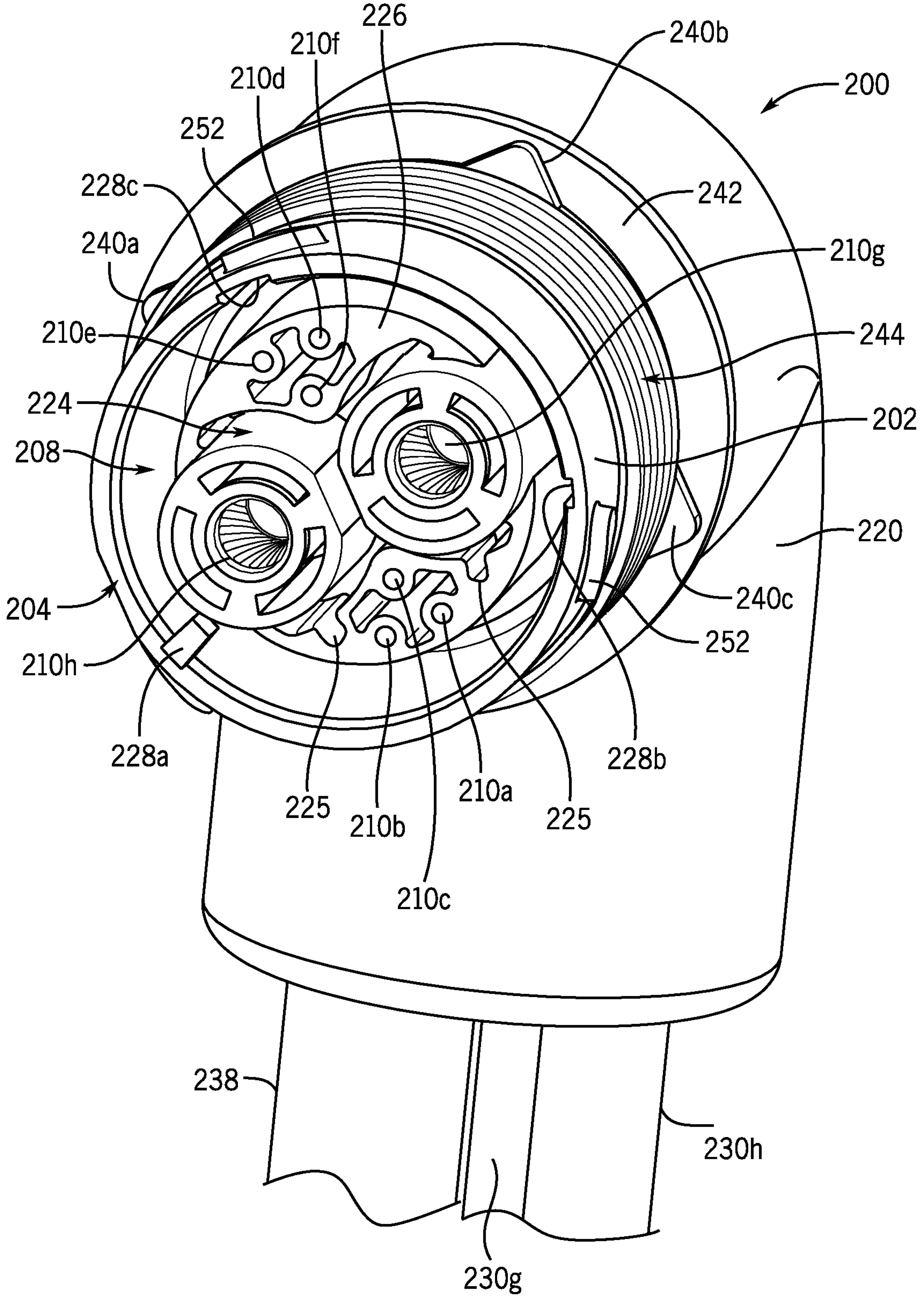
FIG. 9 is a perspective view of a second connector for a marine device of the electric marine propulsion systems of the present disclosure.
Figure 10:
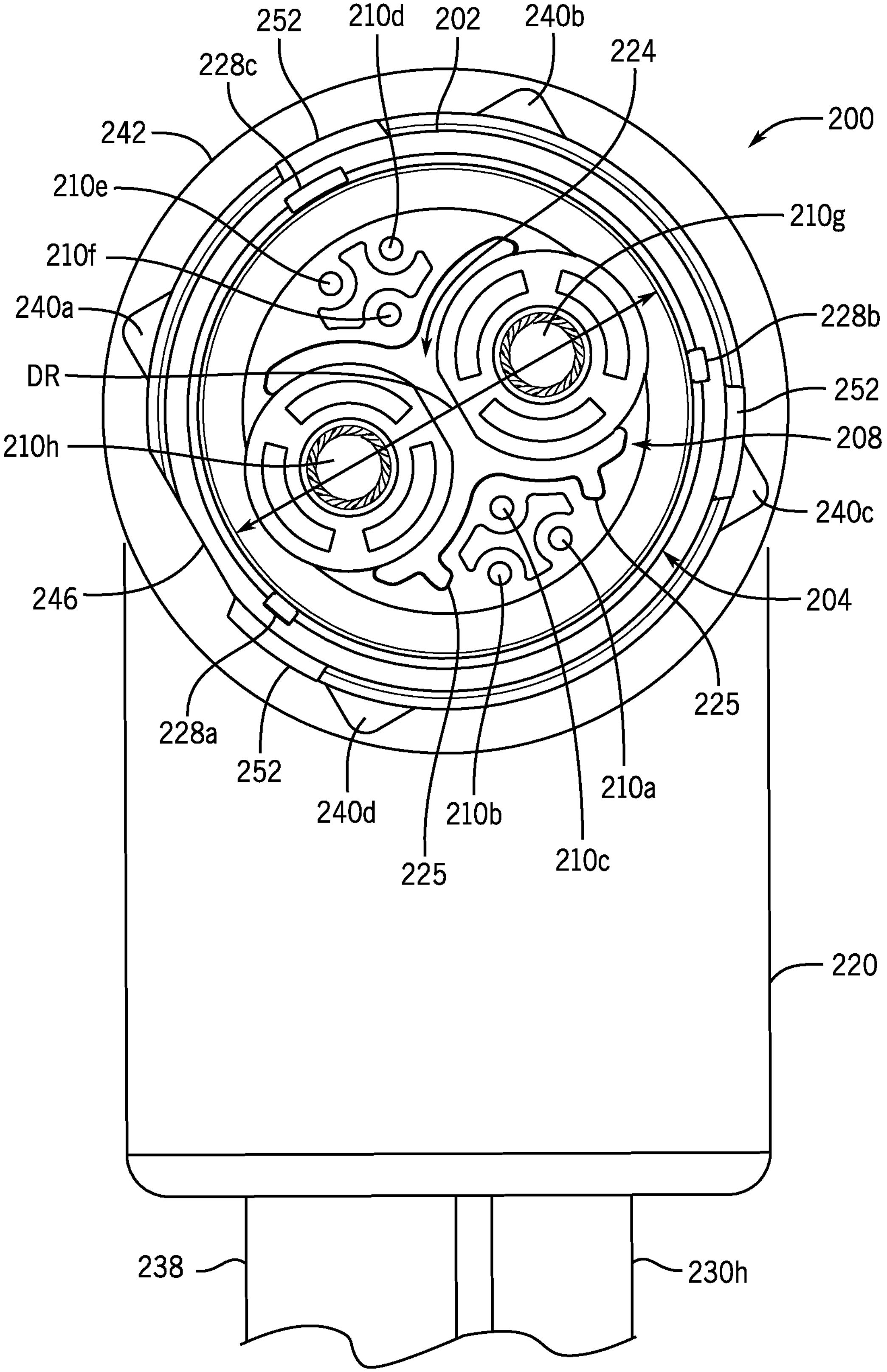
FIG. 10 is a view looking into a housing of the second connector of FIG. 9.
Figure 11:
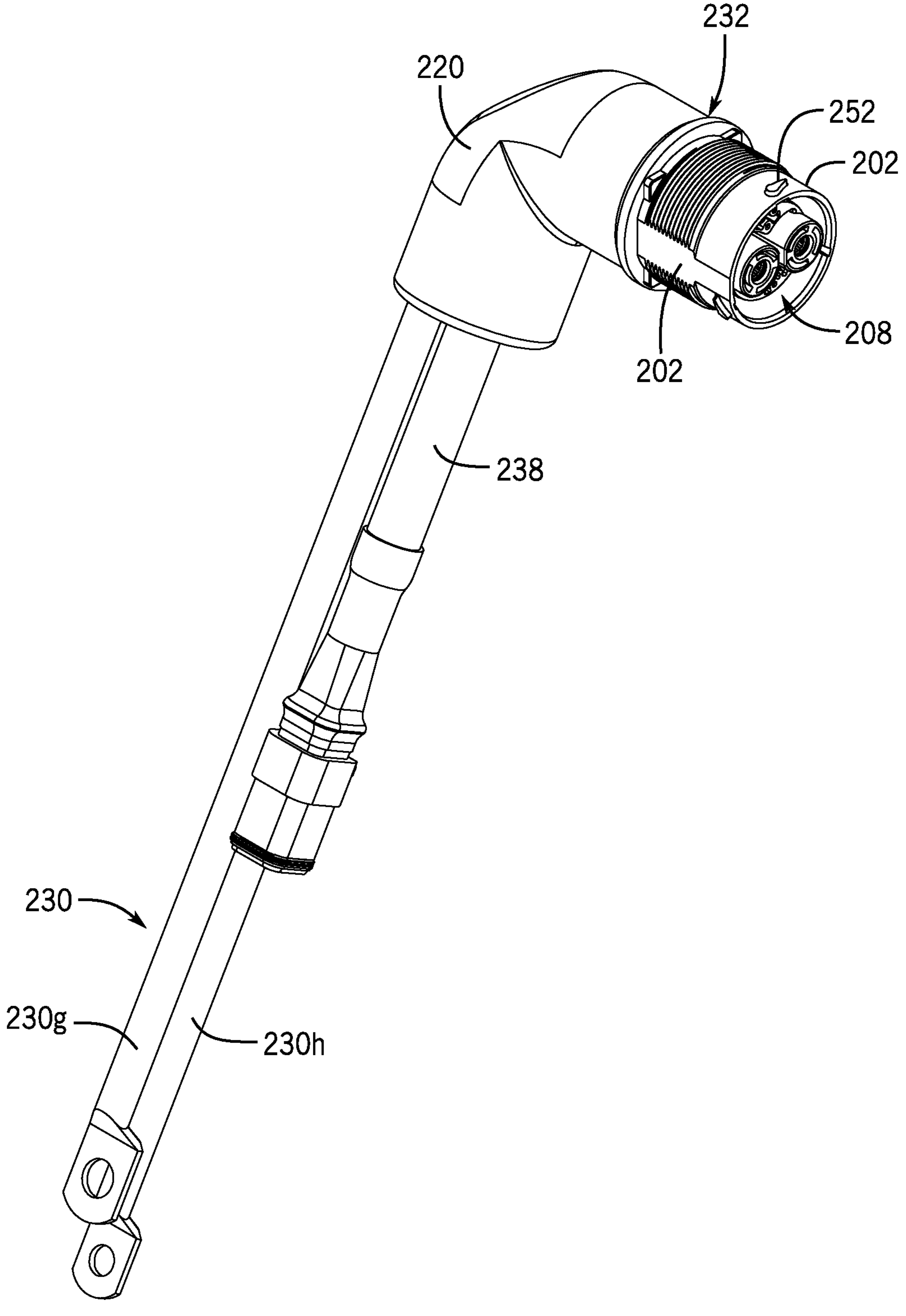
FIG. 11 illustrates the second connector coupled to a cable and wires.
Figure 19:
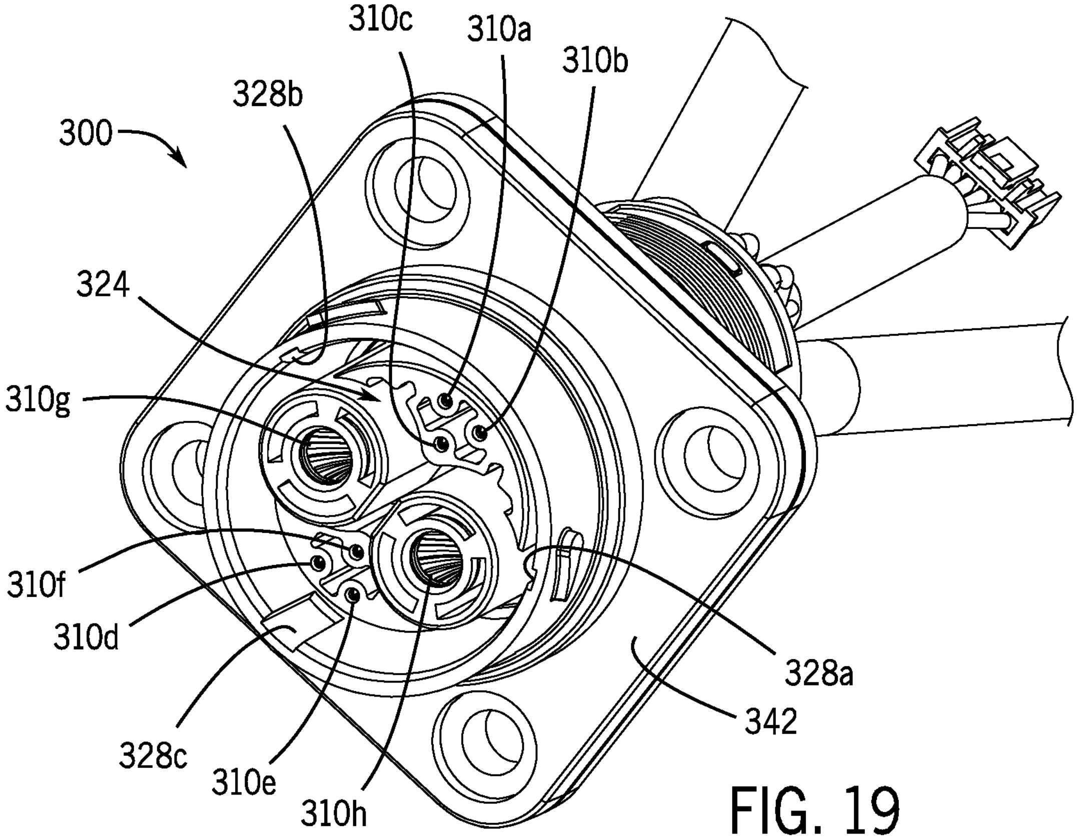
FIG. 19 illustrates a third connector that can be provided on the battery of FIG. 18.

FIG. 5 shows a perspective view of a connector for a marine device, here, the elbow connector 100 provided as part of the connection cables 90 shown in FIGS. 1-4. Thus, the connector 100 of FIG. 5 can be provided on either or both ends of the cables 122 connecting the electric marine drive 3 to the switch box 7 or to the battery 18, or the cables 122 connecting the switch box 7 to the battery 18. As will be described further herein below, the connector 100 is configured to be mated with a connector 200 as shown in FIGS. 9-11 or a connector 300 as shown in FIG. 19. The connector 100 has a barrel-shaped housing 102 having an open first end 104 and an opposite second end 106 (see FIGS. 16 and 17, which show cross sections through the connector 100). FIG. 6 shows a view looking straight into the connector 100 from the first end 104. A plug 108 is provided within the housing 102. The plug 108 comprises a plurality of electrical pins 110*a-h* supported within a base surface 126 of the plug 108. A sleeve 112 surrounds the housing 102 and is rotatable with respect to the housing 102 for reasons that will be described herein below. A perimetral seal 114, which may be an elastomeric gasket, is provided about an outer surface of the housing 102. A backshell 120, which will be described further herein below, is provided at the second end 106 of the housing 102 between the housing 102 and a cable 122.

The plurality of electrical pins 110*a-h* includes first and second power pins 110*g*, 110*h*. The power pins 110*g*, 110*h* are configured to be electrically connected to the battery 18 to carry electrical power through the cable 122. The power pins 110*g*, 110*h* may have insulators on their distal ends to prevent a user or another device from unintentionally grounding the circuit with a battery 18. The first and second power pins 110*g*, 110*h* are aligned along a diameter DP of the plug 108 and a remainder of the electrical pins 110*a-f* in the plurality of electrical pins are symmetrically located on either side of the diameter DP of the plug 108. Specifically, in the present example there are three electrical pins on either side of the diameter DP of the plug 108: electrical pins 110*a-c* on a first side of the diameter DP and electrical pins 110*d-f* on a second side of the diameter DP. Electrical pin 110*a* is symmetrically located with electrical pin 110*d* with respect to the diameter DP. Electrical pin 110*b* is symmetrically located with electrical pin 110*e* with respect to the diameter DP. Electrical pin 110*c* is symmetrically located with electrical pin 110*f* with respect to the diameter DP. The remainder of the electrical pins 110*a-f* may include one or more signal pins, interlock pins, and/or drain pins. The signal pins are configured to be connected to signal wire(s) (e.g., three pins in a CAN bus arrangement: CAN high, CAN low, CAN ground) forming part of communication link 34, the interlock pins are configured to be connected to wires forming part of an interlock circuit, and the drain pin is configured to be connected to a ground wire.

The present inventors placed the power pins 110*g*, 110*h* along the diameter DP of the plug 108 in order to allow the diameter DP of the plug 108 to have as small a dimension as possible. To maximize the space around the power pins 110*g*, 110*h*, the remainder of the electrical pins 110*a-f* are arranged symmetrically with respect to the diameter DP. Such a placement allows the electrical pins 110*c*, 110*f* to be placed as close to the power pins 110*g*, 110*h* as possible to maintain the plug 108 compact. However, the inventors realized that the symmetry of the electrical pins 110*a-f* about the diameter DP could result in a mating connector 200 (FIG. 9-11) or 300 (FIG. 19) being incorrectly connected to the connector 100. Thus, keys are provided on the connector 100 to prevent such incorrect connection.

In the depicted examples, an asymmetrical key 124 is provided within the housing 102 and divides the first and second power pins 110*g*, 110*h*. The key 124 has the shape of two "C's" situated back-to-back, each "C" partially surrounding the power pins 110*g*, 110*h*. The key 124 projects from the base surface 126 of the plug 108 toward the first end 104 of the housing. Asymmetry is provided by the inclusion of nubs 125 on the top of each "C," which nubs are not provided on the bottom of each "C." Thus, the key 124 is asymmetrical with respect to the diameter DP of the plug 108. The location, shape, and/or number of nubs 125 could vary from that shown. The key 124 is configured to be received within a corresponding keyway 224 (FIGS. 9, 10) provided in a first portion of the mating connector 200, 300 as will be described herein below. An additional key is provided on the outer surface of the housing 102 of the first connector 100. More specifically, as best shown in FIG. 6, three additional keys 128*a-c* are provided on the outer surface of the housing 102. The keys 128*a* and 128*b* have the same size, but the key 128*c* is wider. In other examples, the keys 128*a-c* all have the same size, or the keys 128*a* and 128*b* are wider than the key 128*c*. The additional key (e.g., keys 128*a-c*) is configured to be received within a corresponding additional keyway (e.g., keyways 228*a-c*, FIGS. 9, 10) formed in a second portion of the mating connector 200, 300.

Figures 7, 8:
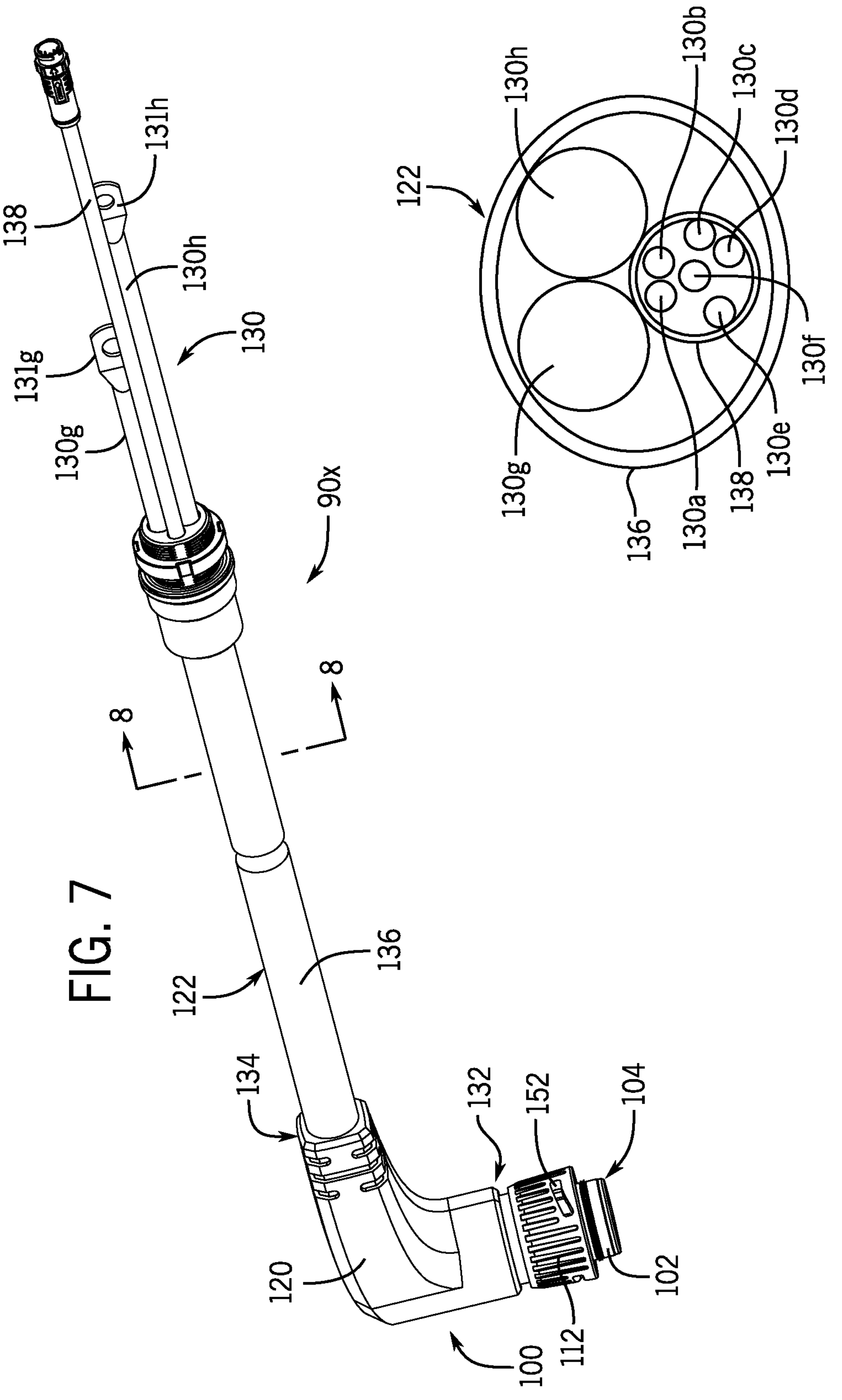
FIG. 7 illustrates the first connector coupled to a cable.
FIG. 8 is a cross section of the cable taken along the line 8-8 in FIG. 7.

Referring now also to FIG. 7, a plurality of wires 130 is respectively connected to the plurality of electrical pins 110*a-h*. The plurality of wires 130 includes at least a first power wire 130*g* and a second power wire 130*h*, connected respectively within the plug 108 to power pins 110*g* and 110*h*. As noted, the power wires 130*g*, 130*h* carry electrical power through the cable 122. The backshell 120 has a first end 132 that interfaces with the second end 106 of the housing 102 and surrounds the plurality of wires 130. A first cable jacket 136 extends from an opposite second end 134 of the backshell 120. The first cable jacket 136 surrounds the plurality of wires 130. A second cable jacket 138 surrounds a subset of the plurality of wires 130, such as the wires that are respectively connected within the plug 108 to the electrical pins 110*a-f*. This subset of pins/wires can be for signal, interlock, and/or drain purposes as noted herein above. The second cable jacket 138 extends through the first cable jacket 136 and shields the signal wires and other wires within the second cable jacket 138 from the power wires 130*g*, 130*h*. A schematic cross-section of the cable 122 is provided in FIG. 8, showing the wires 130*a-f* surrounded by the second cable jacket 138 and showing the second cable jacket 138 and the wires 130*g*, 130*h* surrounded by the first cable jacket 136.

FIG. 9 shows a perspective view of another connector 200 for a marine device, such as for the electric marine drive 3 shown in FIGS. 1-4. In one example, the connector 200 forms the port provided on the electric marine drive 3 to which the elbow connector 100 can be mated. The connector 200 includes a housing 202 configured to pass through an aperture in the outer cowling 50 of the electric marine drive 3, as will be described further herein below. The housing 202 has an open first end 204 and an opposite second end 206 (see FIGS. 16 and 17, which show cross sections through the connector 200). FIG. 10 shows a view looking straight into the connector 200 from the first end 204. A receptacle 208 is located within the housing 202. The receptacle 208 comprises a plurality of electrical sockets 210*a-h* formed in an end surface 226 of the receptacle 208. A plurality of wires, including wires 230*g*, 230*h*, is respectively connected to the plurality of electrical sockets (e.g., wire 230*g* is connected to electrical socket 210*g* and wire 230*h* is connected to electrical socket 210*h*). A backshell 220 interfaces with the second end 206 of the housing 202 and surrounds the plurality of wires 230*g*, 230*h* and a cable jacket 238, which in turn surrounds additional wires, as will be described further herein below.

In the present example, the plurality of electrical sockets 210*a-h* includes first and second power sockets 210*g*, 210*h*. As noted, the power sockets 210*g*, 210*h* are configured to be connected to power wires 230*g*, 230*h*, which are configured to conduct electrical power when a battery 18 is electrically connected to the connector 200 as shown in FIGS. 1-4. The power wires 230*g*, 230*h* are configured to be connected to the electric motor 4 to provide power thereto. The receptacle 208 is generally cylindrical and the first and second power sockets 210*g*, 210*h* are aligned along a diameter DR of the receptacle 208. A remainder of the electrical sockets 210*a-f* in the plurality of electrical sockets are symmetrically located on either side of the diameter DR of the receptacle 208. Specifically, in the present example there are three electrical sockets on either side of the diameter DR of the receptacle 208: electrical sockets 210*a-c* on a first side of the diameter DR and electrical sockets 210*d-f* on a second side of the diameter DR. Electrical socket 210*a* is symmetrically located with electrical socket 210*d* with respect to the diameter DR. Electrical socket 210*b* is symmetrically located with electrical socket 210*e* with respect to the diameter DR. Electrical socket 210*c* is symmetrically located with electrical socket 210*f* with respect to the diameter DR. The remainder of the electrical sockets 210*a-f* may include one or more signal sockets, interlock sockets, and/or drain sockets, which are configured to be connected to signal wires, interlock wires, and/or drain wires, respectively.

The present inventors placed the power sockets 210*g*, 210*h* along the diameter DR of the receptacle 208 in order to allow the diameter DR of the receptacle 208 to have as small a dimension as possible. In order to fill the space around the power sockets 210*g*, 210*h*, the present inventors then placed the remainder of the electrical sockets 210*a-f* symmetrically with respect to the diameter DR. Such a placement allows the electrical sockets 210*c*, 210*f* to be placed as close to the power sockets 210*g*, 210*h* as possible to maintain the receptacle 208 compact. However, the present inventors then realized that the symmetry of the electrical sockets 210*a-f* about the diameter DR could result in a mating connector 100 (FIGS. 5-7) being incorrectly connected to the connector 200. Thus, the present inventors provided keyways on the connector 200 to prevent such incorrect connection.

Specifically, the connector 200 comprises an asymmetrical keyway 224 provided in the receptacle 208 and dividing the first and second power sockets 210*g*, 210*h*. The keyway 224 is recessed from the end surface 226 of the receptacle 208 and has the shape of two "C's" situated back-to-back, each "C" partially surrounding a respective power socket 210*g* or 210*h*. Asymmetry is provided by the inclusion of recesses 225 on the bottom of each "C," which recesses are not provided on the top of each "C." Thus, the keyway 224 is asymmetrical with respect to the diameter DR of the receptacle 208. The location, shape, and/or number of recesses 225 could vary from that shown, but should match the location, shape, and/or number of nubs in the plug 108. The keyway 224 is configured to receive the corresponding key 124 provided on a portion of the mating connector 100 (FIGS. 5-6). An additional keyway is formed in an inner surface of the housing 202. More specifically, three additional keyways 228*a-c* are provided in the inner surface of the housing 202. Keyways 228*a*, 228*b* are narrower than keyway 228*c*, but in other examples, all keyways 228*a-c* could have the same width, or keyway 228*c* could be narrower than keyways 228*a* and 228*b*. The additional keyway (e.g., keyways 228*a-c*) is configured to receive the corresponding additional key (e.g., keys 128*a-c*) provided on a portion of the mating connector 100.

Referring now also to FIG. 11, as noted hereinabove, a plurality of wires 230 is respectively connected to the plurality of electrical sockets 210*a-h* in the receptacle 208. The plurality of wires 230 includes at least a first power wire 230*g* and a second power wire 230*h*, connected respectively within the receptacle 208 to power sockets 210*g* and 210*h*. These power wires 230*g*, 230*h* are configured to carry electrical power when a battery 18 is connected to the receptacle 208 via the plug 108 of a given connection cable 90. The backshell 220 has a first end 232 that interfaces with the second end 206 of the housing 202 (see also FIGS. 16 and 17) and surrounds the plurality of wires 230. A subset of the plurality of wires 230 is provided within a separate cable jacket 238. The subset of wires in the cable jacket 238 may include the signal, interlock, and drain wires, which may have the same purposes as the signal, interlocks and drain wires described hereinabove with respect to the first connector 100.

Referring back to FIGS. 9 and 10, the housing 202 comprises a geometrical feature extending outwardly from an outer surface of the housing 202. Specifically, the housing 202 comprises four geometrical features 240*a-d*, each in the form of a triangle. The geometric features 240*a-d* are raised with respect to a flange 242 that surrounds the housing 202 at the second end 206 of the housing 202. The geometric features 240*a-d* are equally spaced and together form four points of a square centered on the housing 202. However, the geometric features could instead form three points of a triangle or could be unequally spaced.

Figure 12:
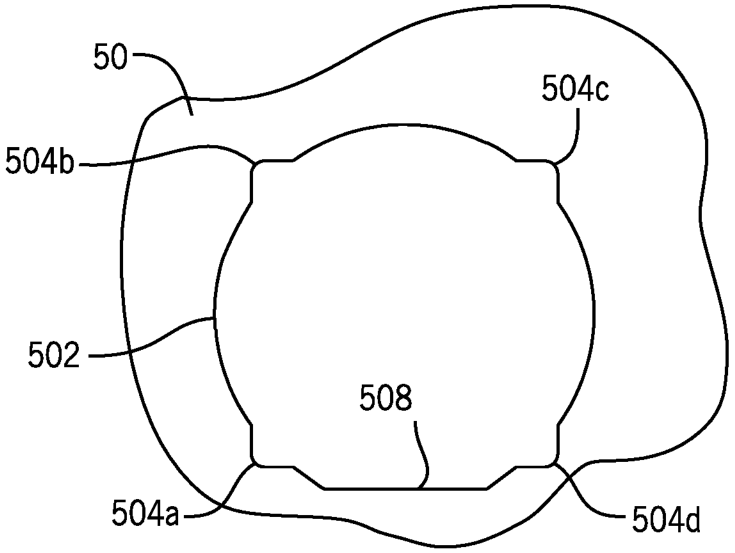
FIG. 12 shows an aperture that may be provided in a cowling of an electric marine drive to install the second connector of FIGS. 9-11 therein.
Figure 13:
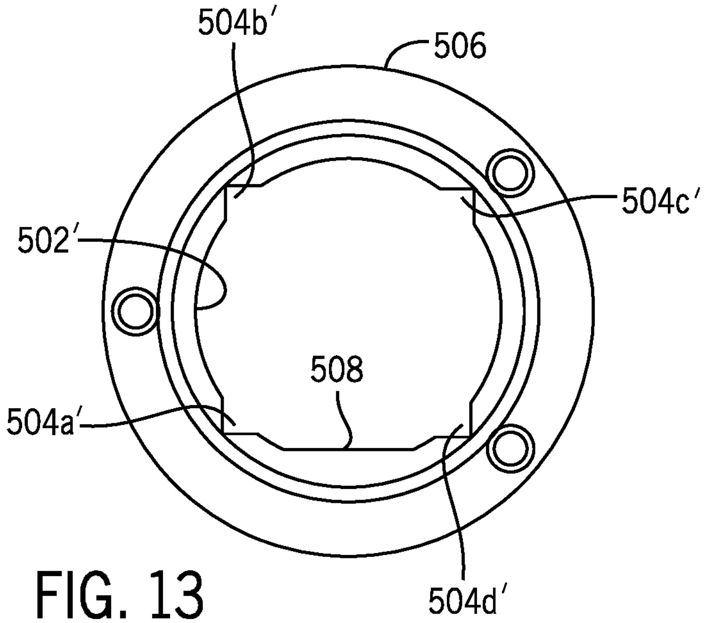
FIG. 13 shows an adapter that may be used to provide the aperture in the cowling of the electric marine drive.
Figure 14:
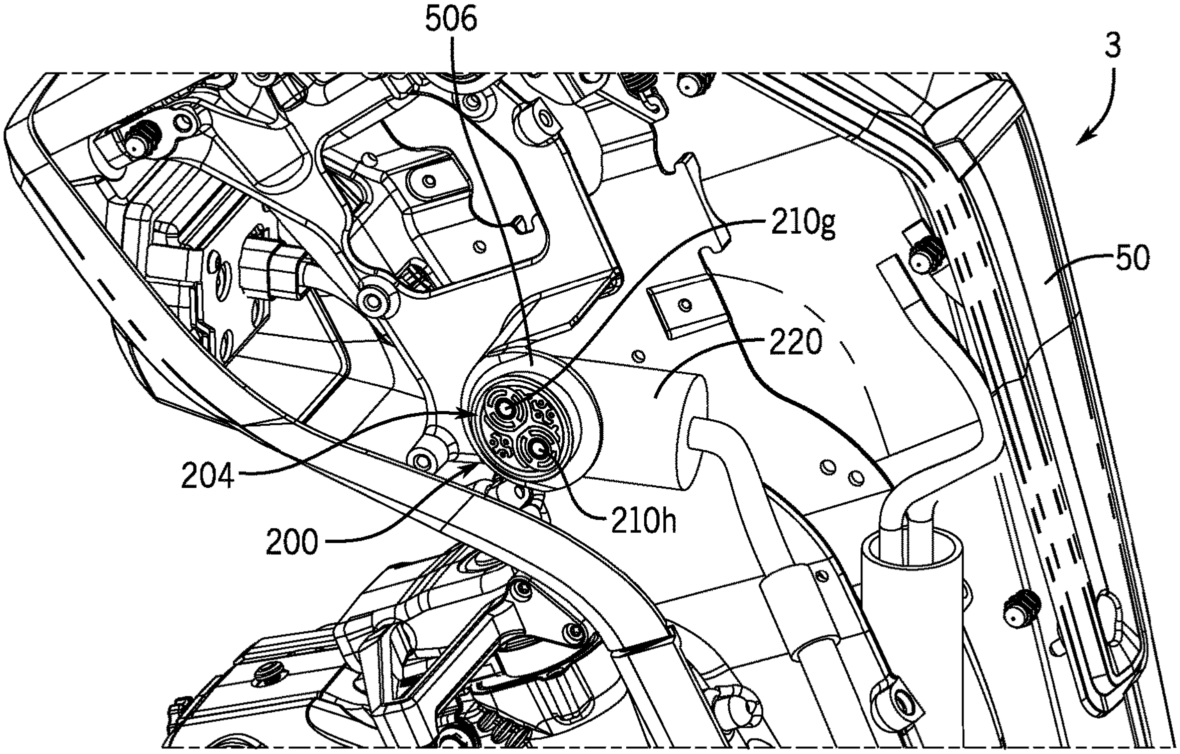
FIG. 14 shows a portion of an electric marine drive with the second connector of FIGS. 9-11 installed therein.

Referring to FIGS. 12-14, as noted hereinabove, the housing 202 of the connector 200 is configured to pass through an aperture 502 in an outer cowling 50 of the electric marine drive 3. The geometrical feature on the housing 202 of the second connector 200 is configured to be received in a corresponding geometrical feature in the aperture 502 in the outer cowling 50 in a manner that prevents rotation of the housing 202 with respect to the aperture 502 and thus the cowling 50. Specifically, the geometrical features 240*a-d* on the housing 202 are configured to be received in corresponding geometrical features 504*a-d* in the aperture 502 in the outer cowling 50 in a manner that prevents rotation of the housing 202 with respect to the aperture 502. The geometrical features 504*a-d* are also in the shape of triangles spaced equally apart and forming the corners of a square centered on what is otherwise a generally circular aperture 502 having a diameter slightly larger than the diameter of the housing 202. The geometrical features 504*a-d* can be made directly in the cowling 50 as shown in FIG. 12 or can be made in an adapter 506 as shown in FIG. 13. If the adapter 506 is used, the geometrical features 504*a*'-d' are preformed in the adapter 506, the cowling 50 is cut or formed to the outside shape of the adapter 506 (here, a circle), and the adapter 506 is inserted in the appropriately sized space in the cowling 50. Using an adapter may 506 make manufacturing of the cowling 50 easier and/or may allow for more precise forming of the aperture 502' and geometrical features 504*a*'-d'.

FIG. 14 shows a portion of the electric marine drive 3 with the cowling 50 on the near side of the electric marine drive 3 removed so that the location of the adapter 506 and connector 200 situated therein can be seen. With the connector 200 placed inside the cowling 50 and the first end 204 of the housing 202 facing outwardly, the geometrical features 240*a-d* and 504*a-d* or 504*a*'-d' are respectively aligned and the housing 202 of the connector 200 is pushed through the aperture 502 or 502' from the inside of the cowling 50. The connector 200 is configured to be installed through the aperture 502 or 502' in the outer cowling 50 such that the backshell 220 and a portion of the housing 202 are located internally of the outer cowling 50 and a remainder of the housing 202 (e.g., at least the first end 204 thereof) is located externally of the outer cowling 50. The flange 242 on the connector 200 sits just internally of the cowling 50, while the geometric features 240*a-d* sit directly within the corresponding geometric features 504*a-d* or 504*a*'-d' of the aperture 502 or 502'. A washer and nut may be placed over the first end 204 of the housing 202 and the nut tightened via the threads 244 (FIG. 9) on the outer surface of the housing 202 until the washer contacts the cowling 50 or the adapter 506. The adapter 506 is then held in place between the washer and nut on the outside of the cowling 50 and the flange 242 of the housing 202 on the inside of the cowling 50. The situating of the geometric features 240*a-d* within geometrical features 504*a-d* or 504*a*'-d' ensures that the connector 200 will not rotate with respect to the cowling 50 when external forces (such as connection/disconnection of the connector 100 or jiggling of the cable 122 during use) tend to place a torque on the connector 200. Such an anti-rotation feature provided by geometric features 240*a-d* within geometrical features 504*a-d* or 504*a*'-d' goes beyond that already provided by the D-flat 246 on the housing 202 (FIG. 10) and the corresponding D-flat 508 or 508' in the aperture 502 (FIGS. 12 and 13), which latter feature the present inventors determined is not enough to secure the connector 200 from rotating due to the location of the connector 200 as being nearly flush with the outer cowling 50.

Figure 15:
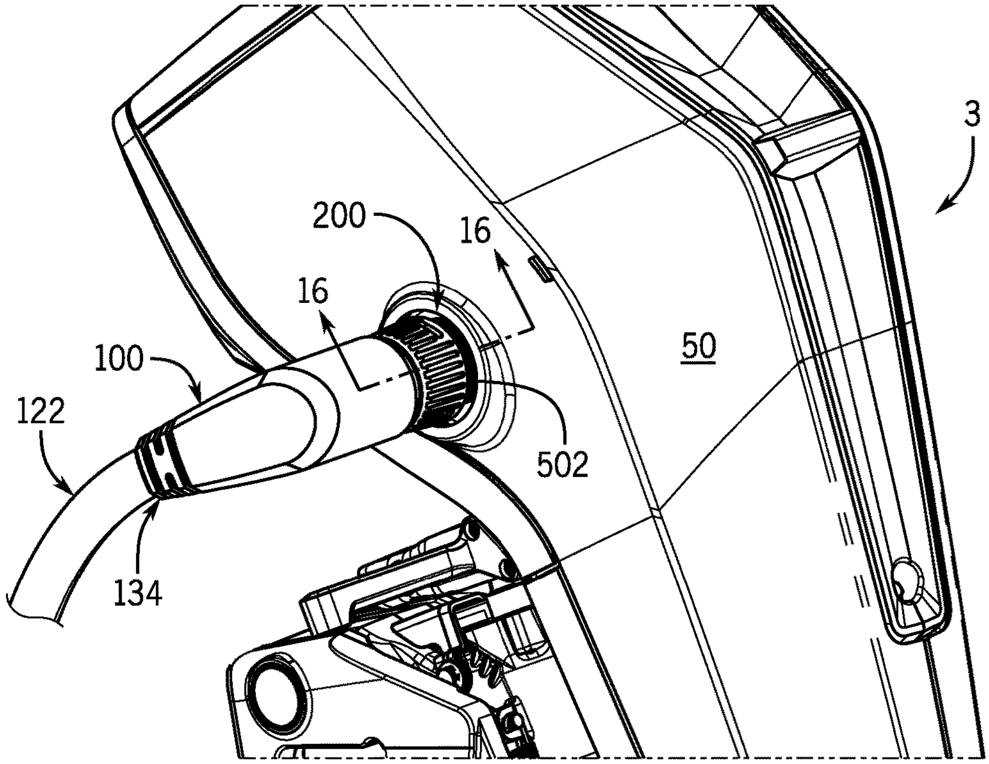
FIG. 15 shows a portion of the electric marine drive of FIG. 14 with the first connector of FIGS. 5-7 mated with the second connector of FIGS. 9-11.

As shown in FIG. 14, the electric marine drive 3 is more or less in a vertically upright position. In other words, its steering shaft is more or less perpendicular with respect to the surface of the water in which the electric marine drive 3 is operating. This may be the case when, for example, the electric marine drive 3 is in a neutral trim position, not trimmed in or trimmed out. The connector 200 is configured to be installed in the electric marine drive 3 such that the first and second power sockets 210*g*, 210*h* are not vertically aligned with one another when the electric marine drive 3 is in the upright position. This clocking correlates to an intuitive and ergonomic connection of the connector 100 of FIGS. 5-7 with the connector 200 of FIGS. 9-11, as shown in FIG. 15. Specifically, the connector 100 is configured to connect with the connector 200 in a manner such that the second end 134 of the backshell 120 is located forwardly (with respect to the marine vessel) of the housing 102 where connection is made to the electric marine drive 3. Such an orientation of the elbow-shaped connector 100 makes it easy for a user to grip the connector 100 with their right hand to connect/disconnect the connector 100 to/from the connector 200 while on the marine vessel. In terms of human-machine interaction, it would be counterintuitive for a user to flip the connector 100 in an opposite direction in which the backshell 120 cannot be used as a “handle” of sorts to hold the connector 100. This intuitive “handle” feature of the elbow connector 100 thus also prevents attempts to incorrectly mate the connectors 100, 200.

FIGS. 14 and 15 also show how the connector 200 is used to create a power/signal port on the cowling 50 of the electric marine drive 3 that is aesthetically pleasing and prevents water ingress. The port sheds water due to its vertical orientation and does not hang off of the electric marine drive 3 as do current pigtail-style assemblies. This makes it easier for a user to remove the electric marine drive 3 from the marine vessel and transport and/or store it elsewhere, as the user does not need to worry about electronic equipment hanging off of or out of the cowling 50 being damaged. The port on the electric marine drive 3 can be provided with a waterproof cap that mates to the connector 200 and/or with a hatch-type door on the cowling 50.

Figure 16:
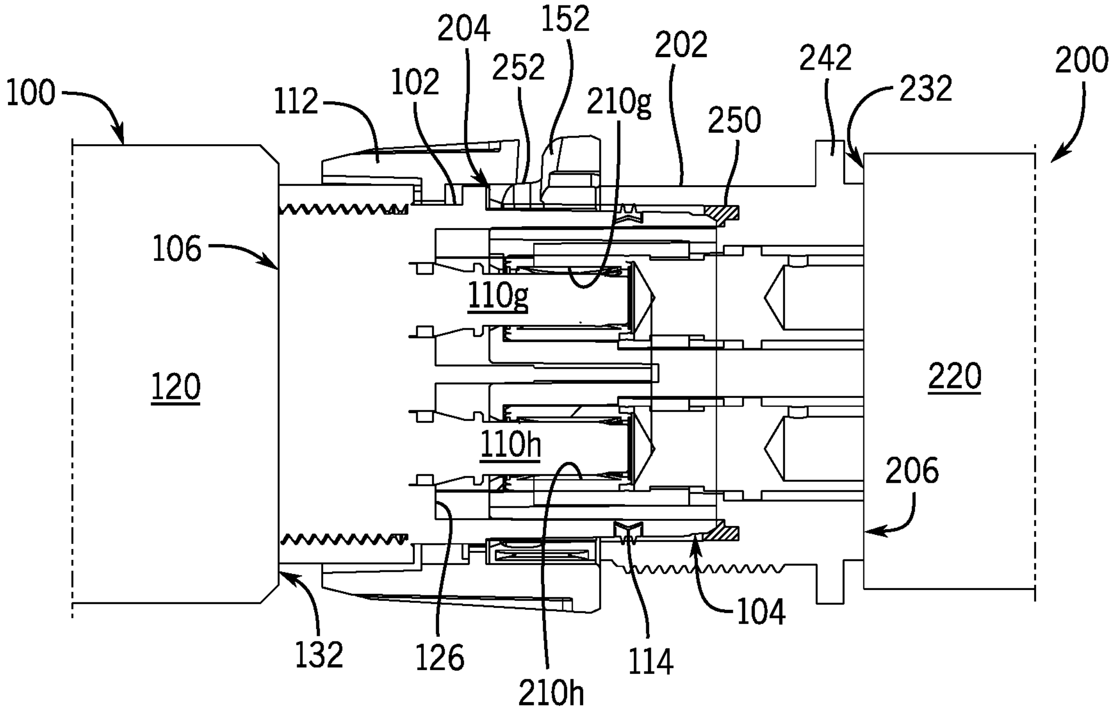
FIG. 16 is a cross section of the mated first and second connectors taken along the line 16-16 in FIG. 15.
Figure 17:
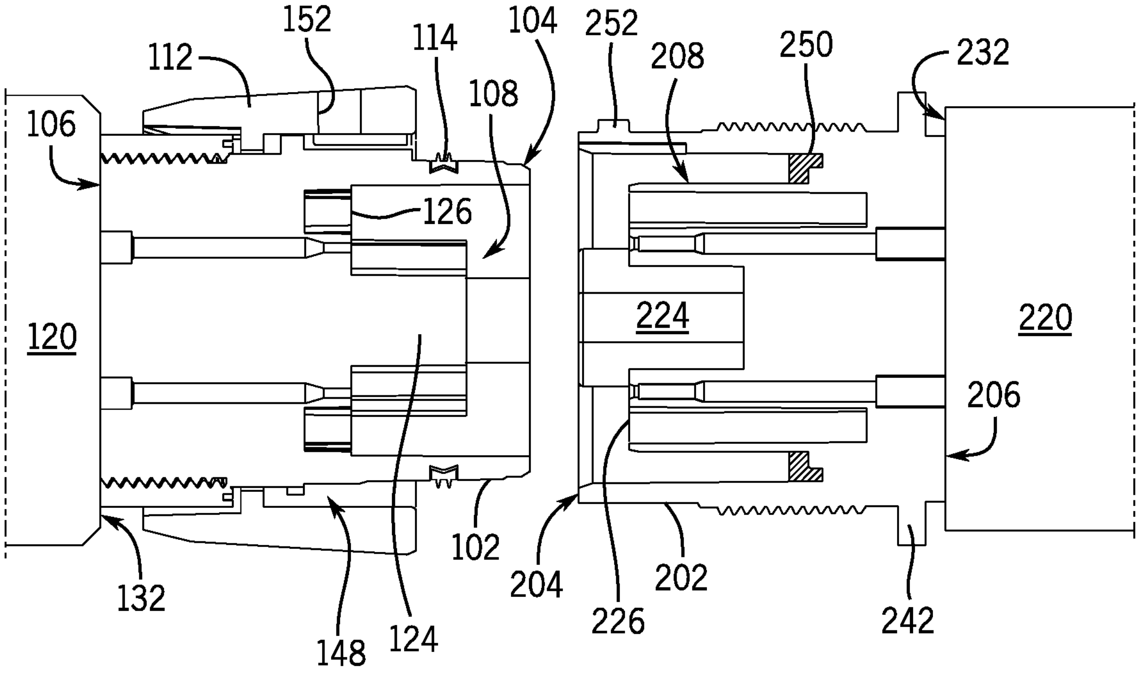
FIG. 17 is a cross section of the first and second connectors taken perpendicular to the cross section of FIG. 16, with the first and second connectors not being mated together.

As shown in FIGS. 16 and 17, according to the present disclosure, the housing 102 of the connector 100 is configured to receive a first portion (here, the receptacle 208) of the mating connector 200 via the first end 104 of the housing 102. An annular gap 148 (see also FIG. 6) between the outer surface of the housing 102 and the sleeve 112 is configured to receive a second portion (here, a distal portion of the housing 202) of the mating connector 200, and the perimetral seal 114 is configured to contact the second portion (i.e., the annular inside surface of the housing 202) of the mating connector 200. Simultaneously, the housing 202 of the connector 200 is configured to receive a portion (here, the distal portion of the housing 102) of the mating connector 100 via the first end 204 of the housing 202. Once the two connectors 100, 200 have been mated, the sleeve 112 can be twisted about the housings 102 and 202 such that keys 252 on the outer surface of the housing 202 ride within slots 152 in the sleeve 112 to lock the connectors 100, 200 together against accidental disconnection.

Note that the power pins 110*g*, 100*h* are longer than the electrical pins 110*a-f* (see FIG. 5) and therefore the power pins 110*g*, 100*h* mate with the power sockets 210*g*, 210*h* (see FIG. 16) before the electrical pins 110*a-f* mate with the electrical sockets 210*a-f*. The connectors are thus designed such that the power pins 100*g*, 100*h* can carry 100% rated current from the battery 18 to the electric motor 4 after the signal pins (which are a subset of the electrical pins 100*a-e*) mate with their respective electrical sockets. In some examples, the interlock circuit must also be completed by mating of a subset of the electrical pins 100*a-e* with their respective electrical sockets before the power pins 100*g*, 100*h* can carry 100% rated current from the battery 18 to the electric motor 4.

Thus, the present disclosure is of a pair of connectors 100, 200 for marine devices, the pair of connectors 100, 200 comprising a first connector 100 and a second connector 200. The first connector 100 comprises a first housing 102 having an open first end 104 and an opposite second end 106. A plug 108 is provided within the first housing 102, the plug 108 comprising a plurality of electrical pins 110*a-h*. First and second electrical pins 110*g*, 110*h* of the plurality of electrical pins are aligned along a diameter DP of the plug 108 and a remainder of the electrical pins 110*a-f* in the plurality of electrical pins are symmetrically located on either side of the diameter DP of the plug. The first connector 100 also comprises a sleeve 112 surrounding the first housing 102 and an asymmetrical key 124 provided within the first housing 102 and dividing the first and second electrical pins 110*g*, 110*h*. The second connector 200 comprises a second housing 202 having an open first end 204 and an opposite second end 206. A receptacle 208 is located within the second housing 202, the receptacle 208 comprising a plurality of electrical sockets 210*a-h*. First and second electrical sockets 210*g*, 210*h* of the plurality of electrical sockets are aligned along a diameter DR of the receptacle 208 and a remainder of the electrical sockets 210*a-f* in the plurality of electrical sockets are symmetrically located on either side of the diameter DR of the receptacle 208. The second connector 200 also comprises an asymmetrical keyway 224 provided in the receptacle 208 and dividing the first and second electrical sockets 210*g*, 210*h*.

The first housing 102 of the first connector 100 is configured to receive the receptacle 208 of the second connector 200 via the first end 104 of the first housing 102. A gap 148 between an outer surface of the first housing 102 and the sleeve 112 is configured to receive the second housing 202 of the second connector 200. Further, the keyway 224 of the second connector 200 is configured to receive the key 124 of the first connector 100. An additional key 128*a-c* is provided on the outer surface of the first housing 102 and an additional keyway 228*a-c* is formed in an inner surface of the second housing 202. The additional keyway 228*a-c* is configured to receive the additional key 128*a-c*. The keys and keyways prevent incorrect connection of the connectors 100, 200 as the connectors 100, 200 are physically incapable of mating unless all keys are aligned with all corresponding keyways.

The second connector 200 further comprises a plurality of wires 230 respectively connected to the plurality of electrical sockets 210*a-h* and a backshell 220 interfacing with the second end 206 of the second housing 202 and surrounding the plurality of wires 230. The second connector 200 is configured to be installed through an aperture 502 in an outer cowling 50 of an electric marine drive 3 such that the backshell 220 and a portion of the second housing 202 are located internally of the outer cowling 50 and a remainder of the second housing 202 is located externally of the outer cowling 50. The second connector 200 is configured to be installed in the electric marine drive 3 such that the first and second electrical sockets 210*g*, 210*h* are not vertically aligned with one another when the electric marine drive 3 is in an upright position. The second housing 202 comprises a geometrical feature 240*a-d* extending outwardly from an outer surface of the second housing 202. The geometrical feature 240*a-d* on the second housing 202 is configured to be received in a corresponding geometrical feature 504*a-d* or 504*a*'-d' in the aperture 502 or 502' in the outer cowling 50 in a manner that prevents rotation of the second housing 202 with respect to the aperture 502 or 502'.

A plurality of wires 130 is respectively connected to the plurality of electrical pins 110*a-h* of the first connector 100. A backshell 120 has a first end 132 interfacing with the second end 106 of the first housing 102 and surrounds the plurality of wires 130. A first cable jacket 136 extends from an opposite second end 134 of the backshell 120. The first cable jacket 136 surrounds the plurality of wires 130. A second cable jacket 138 surrounds a subset 130*a-f* of the plurality of wires. The second cable jacket 138 extends through the first cable jacket 136 to shield the wires in the second cable jacket 138 from those outside the second cable jacket 138.

FIGS. 16 and 17 also show a first perimetral seal 250 located within the second housing 202 around an outer surface of the receptacle 208. The first perimetral seal 250 is configured to abut the first end 104 of the first housing 102 when the connectors 100, 200 are mated. A second perimetral seal 114 is provided about an outer surface of the first housing 102. The second perimetral seal 114 is configured to contact an inner surface of the second housing 202 when the connectors 100, 200 are mated. The second perimetral seal 114 is located between the first and second ends 104, 106 of the first housing 102. While the first perimetral seal 250 can provide a watertight seal when the connectors 100, 200 are mated perfectly and one is not tilted with respect to the other, the second perimetral seal 114 is able to provide a watertight seal even when the first connector 100 is tilted with respect to the second connector 200.

Figure 18:
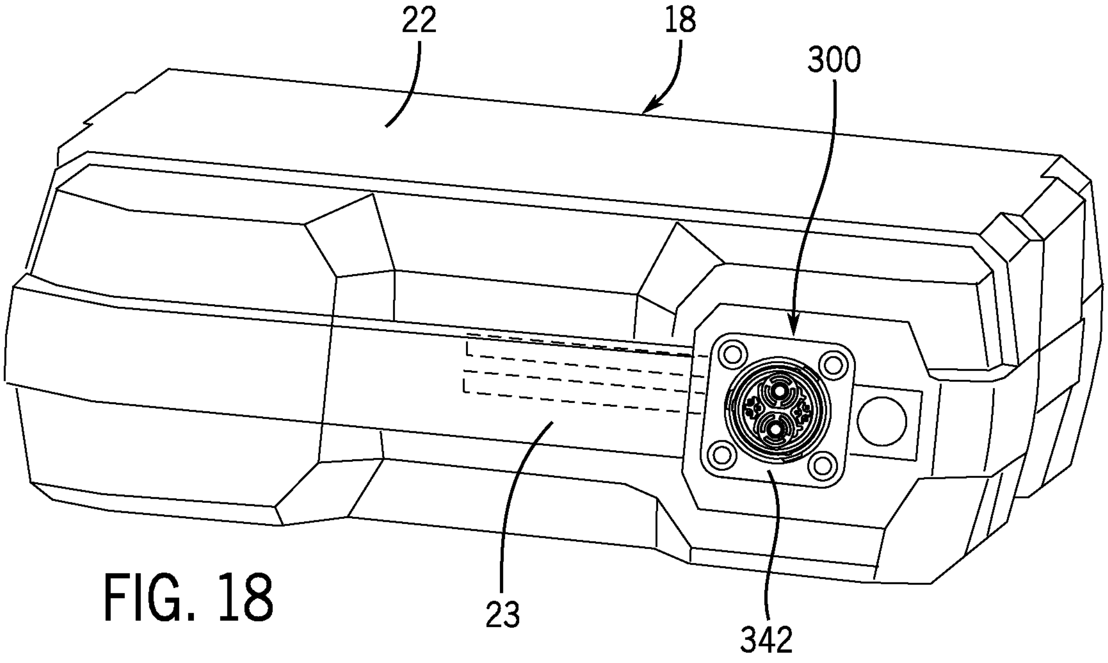
FIG. 18 illustrates a battery according to the present disclosure.

FIG. 18 shows a battery 18 according to the present disclosure, on which a battery port is provided as noted hereinabove with respect to FIGS. 1-4. The battery port is itself a connector 300 very similar to the connector 200 provided on the electric marine drive 3. The connector 300 has a flange 342 providing for connection to the battery housing 22. Other than the shape of this flange 342, the lack of a D-flat 246, threads 244, or geometrical features 240*a-d* on the connector 300 (all of which may be particular to a connector 200 to be installed on the cowling 50), the remainder of the connector 300 is identical to the connector 200. Parts of the connector 300 that are labeled with a “3” in the hundreds place correspond to the same parts labeled with a “2” in the hundreds place and the same two numerals in the tens and ones places. Therefore, each of the parts of the connector 300 will not be described further herein. The connector 100 can be mated to the connector 300 in the same way as described with respect to FIGS. 16 and 17 regarding mating of the connectors 100 and 200. Thus, the same connector 100 can be used to mate to the connector 300.

Referring now to all the figures, one of ordinary skill in the relevant art would understand that various configurations of connectors 100, 200, 300 and cables could be provided for any given connection cable 90 in the electric marine propulsion system 2. For instance, the connection cable 90*d* of FIG. 2 has an elbow connector 100*y*, 100*z* on either end, each connector 100*y*, 100*z* being the same as the connector 100 described with respect to FIGS. 5-7. In other examples, it may be beneficial to use a connector cable 90*x* like that shown in FIG. 7, with ring terminals 131*g*, 131*h* on the ends of the power wires 130*g*, 130*h* for connection to the switch box 7 or to the battery 18. In still other examples, straight connectors can be used on one or both ends of a connection cable 90, such as the straight connectors 99*a*, 99*b* shown on the switch box 7 in FIG. 2. These straight connectors would have the same connective configuration (i.e., plug 108) as those of the elbow connector 100 described with respect to FIGS. 5-7, but a different backshell shape to allow for connection of multiple connectors 99 immediately adjacent one another on the switch box 7. Thus, each of the ports on the electric marine drive 3, the switch box 7, and the batteries 18 may have the female configuration of the receptacle 208 described with respect to FIGS. 9-11, while each of the elbow and straight connectors on the ends of connection cables 90 may have the male configuration of the plug 108 described with respect to FIGS. 5-7. It is contemplated that any given connection cable 90 can have one of the following configurations: elbow connectors on both ends; elbow connector on one end and straight connector on the other end; straight connectors on both ends; elbow connector on one end and ring terminals on the other end; straight connector on one end and ring terminals on the other end. In the case where ring terminals are provided on a connection cable 90, the marine device to which the ring terminals are to be connected includes screws for connection of the ring terminal to the device's circuit. A receptacle for the separate signal cable is then also provided.

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims. The methods herein are not limited to being performed in the order described, but could be performed in any logical order.

What is claimed is:

1. A connector for a marine device, the connector comprising:

a barrel-shaped housing having an open first end and an opposite second end;

a plug provided within the housing, the plug comprising a plurality of electrical pins;

a sleeve surrounding the housing;

a circumferential seal provided about an outer surface of the housing; and an asymmetrical key provided within the housing. wherein the asymmetrical key is between and divides a first subset of electrical pins in the plurality of electrical pins from a second subset of electrical pins in the plurality of electrical pins;

wherein the housing is configured to receive a first portion of a mating connector via the first end of the housing; and wherein an annular gap between the outer surface of the housing and the sleeve is configured to receive a second portion of the mating connector and the seal is configured to contact the second portion of the mating connector.

2. The connector of claim 1, wherein the plurality of electrical pins includes first and second power pins.

3. The connector of claim 2, wherein the first and second power pins are aligned with each other along a diameter of the plug, and a remainder of the electrical pins in the plurality of electrical pins are symmetrically located on either side of the diameter of the plug.

4. The connector of claim 3, wherein the asymmetrical key is located between the first power pin and the second power pin, and wherein the key is configured to be received within a corresponding keyway provided in the first portion of the mating connector.

5. The connector of claim 4, further comprising an additional key provided on the outer surface of the housing, the additional key configured to be received within a corresponding additional keyway formed in the second portion of the mating connector.

6. The connector of claim 1, further comprising:

a plurality of wires respectively connected to the plurality of electrical pins;

a backshell having a first end interfacing with the second end of the housing and surrounding the plurality of wires;

a first cable jacket extending from an opposite second end of the backshell, the first cable jacket surrounding the plurality of wires; and a second cable jacket surrounding a subset of the plurality of wires, the second cable jacket extending through the first cable jacket.

7. A connector for an electric marine drive, the connector comprising:

a housing with geometrical features configured to pass through an aperture with corresponding geometrical features in an outer cowling of the electric marine drive, the housing having an open first end and an opposite second end;

a receptacle located within the housing, the receptacle comprising a plurality of electrical sockets;

a plurality of wires respectively connected to the plurality of electrical sockets; and a backshell interfacing with the second end of the housing and surrounding the plurality of wires;

wherein the connector is configured to be installed through the aperture in the outer cowling such that the backshell and a portion of the housing are located internally of the outer cowling, the geometrical features of the housing are within the corresponding geometrical features of the aperture. and a remainder of the housing is located externally of the outer cowling; and wherein the housing is configured to receive a portion of a mating connector via the first end of the housing.

8. The connector of claim 7, wherein the plurality of electrical sockets includes first and second power sockets.

9. The connector of claim 8, wherein the receptacle is generally cylindrical;

wherein the first and second power sockets are aligned with each other along a diameter of the receptacle; and wherein a remainder of the electrical sockets in the plurality of electrical sockets are symmetrically located on either side of the diameter of the receptacle.

10. The connector of claim 9, further comprising an asymmetrical keyway provided in the receptacle that is between and divides the first power socket from the second power socket, the keyway being configured to receive a corresponding key provided on the portion of the mating connector.

11. The connector of claim 10, further comprising an additional keyway formed in an inner surface of the housing, the additional keyway being configured to receive a corresponding additional key provided on the portion of the mating connector.

12. The connector of claim 9, wherein the connector is configured to be installed in the electric marine drive such that the first and second power sockets are not vertically aligned with one another when the electric marine drive is in an upright position.

13. The connector of claim 7, wherein the geometrical features of the housing extending outwardly from an outer surface of the housing; and wherein the geometrical features of the housing are configured to be received in the corresponding geometrical features of the aperture in the outer cowling in a manner that prevents rotation of the housing with respect to the aperture.

14. A pair of connectors for marine devices, the pair of connectors comprising:

a first connector comprising:

a first housing having an open first end and an opposite second end;

a plug provided within the first housing, the plug comprising a plurality of electrical pins, wherein first and second electrical pins of the plurality of electrical pins are aligned with each other along a diameter of the plug and a remainder of the electrical pins in the plurality of electrical pins are symmetrically located on either side of the diameter of the plug;

a sleeve surrounding the first housing; and an asymmetrical key provided within the first housing, wherein the key is between and divides the first electrical pin from the second electrical pin; and a second connector comprising:

a second housing having an open first end and an opposite second end;

a receptacle located within the second housing, the receptacle comprising a plurality of electrical sockets, wherein first and second electrical sockets of the plurality of electrical sockets are aligned with each other along a diameter of the receptacle and a remainder of the electrical sockets in the plurality of electrical sockets are symmetrically located on either side of the diameter of the receptacle; and an asymmetrical keyway provided in the receptacle, wherein the keyway is between and divides the first electrical socket from the second electrical socket;

wherein the first housing of the first connector is configured to receive the receptacle of the second connector via the first end of the first housing;

wherein a gap between an outer surface of the first housing and the sleeve is configured to receive the second housing of the second connector; and wherein the keyway of the second connector is configured to receive the key of the first connector.

15. The pair of connectors of claim 14, wherein the second connector further comprises:

a plurality of wires respectively connected to the plurality of electrical sockets; and a backshell interfacing with the second end of the second housing and surrounding the plurality of wires;

wherein the second connector is configured to be installed through an aperture in an outer cowling of an electric marine drive such that the backshell and a portion of the second housing are located internally of the outer cowling and a remainder of the second housing is located externally of the outer cowling.

16. The pair of connectors of claim 15, wherein the second connector is configured to be installed in the electric marine drive such that the first and second electrical sockets are not vertically aligned with one another when the electric marine drive is in an upright position.

17. The pair of connectors of claim 15, wherein the second housing comprises a geometrical feature extending outwardly from an outer surface of the second housing; and wherein the geometrical feature on the second housing is configured to be received in a corresponding geometrical feature in the aperture in the outer cowling in a manner that prevents rotation of the second housing with respect to the aperture.

18. The pair of connectors of claim 14, further comprising:

an additional key provided on the outer surface of the first housing; and an additional keyway formed in an inner surface of the second housing;

wherein the additional keyway is configured to receive the additional key.

19. The pair of connectors of claim 14, further comprising:

a plurality of wires respectively connected to the plurality of electrical pins;

a backshell having a first end interfacing with the second end of the first housing and surrounding the plurality of wires;

a first cable jacket extending from an opposite second end of the backshell, the first cable jacket surrounding the plurality of wires; and a second cable jacket surrounding a subset of the plurality of wires, the second cable jacket extending through the first cable jacket.

20. The pair of connectors of claim 14, further comprising:

a first perimetral seal located within the second housing around an outer surface of the receptacle, the first perimetral seal being configured to abut the first end of the first housing; and a second perimetral seal provided about an outer surface of the first housing, the second perimetral seal being configured to contact an inner surface of the second housing;

wherein the second perimetral seal is located between the first and second ends of the first housing.

21. A connector for an electric marine drive, the connector comprising:

a housing configured to pass through an aperture in an outer cowling of the electric marine drive, the housing having an open first end and an opposite second end;

a receptacle located within the housing, the receptacle comprising a plurality of electrical sockets;

a plurality of wires respectively connected to the plurality of electrical sockets; and a backshell interfacing with the second end of the housing and surrounding the plurality of wires;

wherein the connector is configured to be installed through the aperture in the outer cowling such that the backshell and a portion of the housing are located internally of the outer cowling and a remainder of the housing is located externally of the outer cowling;

wherein the housing is configured to receive a portion of a mating connector via the first end of the housing;

wherein the plurality of electrical sockets includes first and second power sockets;

wherein the receptacle is generally cylindrical;

wherein the first and second power sockets are aligned with each other along a diameter of the receptacle;

wherein a remainder of the electrical sockets in the plurality of electrical sockets are symmetrically located on either side of the diameter of the receptacle; and wherein the connector further comprises an asymmetrical keyway provided in the receptacle, wherein the keyway is between and divides the first power socket from the second power socket, and wherein the keyway is configured to receive a corresponding key provided on the portion of the mating connector.

* * * * *